United States Patent [19]
Uehara

[11] Patent Number: 6,037,895
[45] Date of Patent: Mar. 14, 2000

[54] VEHICLE MOUNTED RADAR APPARATUS

[75] Inventor: Naohisa Uehara, Tokyo, Japan

[73] Assignee: Mitsubishi Denki Kabushiki Kaisha, Tokyo, Japan

[21] Appl. No.: 09/248,259

[22] Filed: Feb. 11, 1999

[30] Foreign Application Priority Data

Jun. 5, 1998 [JP] Japan ................................ 10-157808

[51] Int. Cl.[7] ............................. G01S 13/00; G01S 13/93
[52] U.S. Cl. ........................... 342/70; 342/104; 342/115; 342/118; 342/159; 342/175; 342/195
[58] Field of Search ................................ 342/27, 28, 29, 342/30, 31, 32, 36, 37, 38, 39, 40, 41, 61, 70, 71, 72, 73, 82, 104, 105, 107, 108, 109, 115, 118, 159, 175, 195, 198, 129, 83, 196, 197

[56] References Cited

U.S. PATENT DOCUMENTS 3,766,554  10/1973  Tresselt .................................... 342/129
3,898,655   8/1975  Tresselt ...................................... 342/83

FOREIGN PATENT DOCUMENTS 63-265186  11/1988  Japan .
 7-27856    1/1995  Japan .
 8-181631   7/1996  Japan .

*Primary Examiner*—Bernarr E. Gregory
*Attorney, Agent, or Firm*—Sughrue, Mion, Zinn, Macpeak & Seas, PLLC

[57] ABSTRACT

In a vehicle mounted radar apparatus such as a pulse Doppler radar, electromagnetic waves produced by an oscillator can be prevented from returning therefrom a reception system by means of a transmission system. The vehicle mounted radar apparatus includes the oscillator for generating electromagnetic waves, a transmitter for transmitting the electromagnetic waves generated by the oscillator to a target, a receiver for receiving electromagnetic waves reflected from the target, a switch for connecting the transmitter to an antenna during transmission of the electromagnetic waves, and for connecting the antenna to the receiver during reception of the electromagnetic waves, a signal processor for calculating a distance between the vehicle and the target, and also a relative speed between the vehicle and the target based upon the electromagnetic waves transmitted to the target and reflected from the target, and a power supply interrupter for interrupting the supply of voltage to the transmitter. Accordingly, during reception of the electromagnetic waves, the supply of voltage to the transmitter is turned off by the power supply interrupter, so that transfer of the electromagnetic waves from the transmitter to the receiver can be prevented.

9 Claims, 16 Drawing Sheets

VEHICLE MOUNTED RADAR APPARATUS

BACKGROUND OF THE INVENTION

1. Field of the Invention

The present invention relates to a vehicle mounted radar apparatus capable of measuring a distance between vehicles. More particularly, the present invention is directed to such a vehicle mounted radar apparatus capable of preventing electromagnetic waves from being returned from a transmitter circuit to a receiver circuit.

2. Description of the Related Art

FIG. 17 is a block diagram conceptually representing a circuit arrangement of a conventional a vehicle mounted radar apparatus.

FIGS. 2 to 4 conceptually indicate operating characteristics of the conventional a vehicle mounted radar apparatus. Moreover, the operating characteristics shown in FIG. 2 may be commonly applied to a vehicle mounted radar apparatus according to the present invention (described later).

The radar apparatus depicted in FIG. 17 is a vehicle mounted radar apparatus of which the entire construction is made compact by using a common transmitter/receiver antenna. Thus, this type of radar apparatus can be readily mounted on a vehicle.

The conventional vehicle mounted radar apparatus of FIG. 17 includes an oscillator 1, a power divider 2, a transmitter amplifier 3 and a transmitter/receiver changeover switch 5. Also, the apparatus further comprises a common transmitter/receiver antenna 6 for transmitting electromagnetic waves toward a target (object) 7 and receiving them reflected therefrom, a receiver amplifier 8, a mixer 9, a filter 10, an automatic gain control amplifier 11, an A/D converter 12, and a signal processing circuit 13.

Next, a description will be made of the electromagnetic wave transmitting operation of the conventional a vehicle mounted radar apparatus with the above arrangement.

First, electromagnetic waves having a transmission frequency of, for example, ftx=76.5 GHz are output from the oscillator 1. The electromagnetic waves pass through the power divider 2 and are then amplified by the transmitter amplifier 3. Since the transmitter/receiver changeover switch 5 connects the transmitter amplifier 3 with the common transmitter/receiver antenna 6, the electromagnetic wave amplified by the amplifier 3 passes through the transmitter/receiver changeover switch 5, and thereafter output from the antenna 6.

Next, the electromagnetic wave receiving operation of this conventional vehicle mounted radar apparatus will be explained.

At the time elapsed from the commencement of the electromagnetic wave transmission by a pulse time width "Tg", for instance, Tg=33.3 ns (=1/30 MHz, equal to a distance of 5 m), the transmitter/receiver changeover switch 5 is switched to the reception side (namely, the position indicated in FIG. 17) so as to connect the antenna 6 with the receiver amplifier 8.

Also, the electromagnetic waves output from the antenna 6 to the surrounding environment are reflected from the target 7 existing at a position separated from the vehicle mounted radar apparatus by a distance "R". Hence, the reflected electromagnetic waves enter into the antenna 6 with a delay time "t" depending upon the distance R with respect to the transmitted electromagnetic waves (see FIG. 2).

When the target has a relative speed, the frequency of the received electromagnetic waves is Doppler-shifted by "fb" with respect to the frequency "ftx" of the transmitted electromagnetic waves, and the Doppler-shifted electromagnetic waves enter the antenna 6. Then, the electromagnetic waves entering from the antenna 6 are amplified by the receiver amplifier 8, and the amplified electromagnetic waves are mixed with electromagnetic waves supplied from the power divider 2 to the LO (local oscillator) 13 by the mixer 9. In consequence of the mixing, a beat signal corresponding to the Doppler shift fb (see FIG. 2) is output from the mixer 9. The beat signal output from the mixer 9 is filtered by the filter 10, the cut-off frequency of which is selected to be 30 MHz. The filtered beat signal is amplified by the AGC amplifier 11, and then the amplified beat signal is input into the A/D converter 12.

Next, a description will be made of a method for calculating the distance and relative speed of the target 7 with the signal processing circuit 13 based upon the data (beat signal) entered from the A/D converter 12.

Assuming that a speed resolution of, for instance, 1 km/h is desired, the resolution "Δf" of the Doppler frequency is calculated based upon the transmission frequency "ftx"= 76.5 GHz whereas $$\Delta f = 2\Delta v / \lambda = (2 \times 0.2777 \text{ m/s}) / 0.003921 \text{ m} = 141.64 \text{ (Hz)} \quad (1)$$
$$= 1 / 7.05997 \text{ (ms)}$$

Consequently, a measurement time of 7.06 ms is required.

In this case, when the maximum measurement distance is selected to be, for example, 150 m, the pulse repetition period becomes 33.3 ns×30=1 μs. To obtain a speed resolution of 1 km/h with the vehicle mounted radar apparatus shown in FIG. 17, when 7060 pulses of the beat signal are acquired at every distance gate, as shown in FIG. 3, and all of the acquired data is processed using a fast Fourier transform (FFT) every distance gate, the Doppler shift "fb" is output at a certain distance gate (see FIG. 4).

In this case, both the distance and the relative speed can be calculated based upon the following formulae (2) and (3):

$$\text{Distance} = tg \times n \times C \quad (2),$$

$$\text{Relative speed} = fb \times C / 2'f0 \quad (3),$$

wherein the symbol "tg" indicates a distance gate time width (pulse time width); symbol "n" indicates a distance gate number; symbol "C" represents the light velocity; symbol "fb" represents a beat frequency; and symbol "f0" denotes the transmission frequency (76.5 GHz).

However, when electromagnetic waves are received by the conventional vehicle mounted radar apparatus, even though the transmitter/receiver changeover switch 5 connects the antenna 6 with the receiver amplifier 8, the electromagnetic waves which are produced from the oscillator 1 and further amplified by the transmitter amplifier 3 are transferred to the receiver amplifier 8 while these electromagnetic waves are attenuated by the transmitter/receiver changeover switch 5.

Generally, isolation of the transmitter/receiver changeover switch 5 is on the order of 20 dB. Consequently, electromagnetic waves having very high levels, as compared with the input levels of the waves reflected from the target 7 into the receiver amplifier 8, continuously enter the receiver amplifier 8.

As previously described, with the conventional vehicle mounted radar apparatus, the electromagnetic waves output from the oscillator 1 and leaking from the transmission system to the receiver system during reception of the electromagnetic waves adversely influence the electromagnetic waves entering the conventional vehicle mounted radar apparatus. Also, the input levels of the leaked electromagnetic waves are very high compared with the input levels of the incoming electromagnetic waves reflected from the target 7. Consequently, there is a problem in that the waves reflected from the target 7 which are originally required in the radar measurement can not be detected.

For example, the frequency spectrum of the waves reflected from the target 7, with a relative speed near zero, is completely overlapped by the frequency spectrum of the electromagnetic waves which are transmitted from the transmitter amplifier 3 to the receiver amplifier 8 via the transmitter/receiver changeover switch 5, so that the frequency spectrum of the waves reflected from the target 7 cannot be detected.

Also, in order to detect the waves reflected from the target 7, with a high relative speed, if the number of bits for the A/D converter 12 is increased to secure the desirable dynamic range, then the target 7 can be detected. However, in general, when the number of bits for the A/D converter 12 is increased, the cost thereof increases exponentially. Accordingly, there is a problem in that this is not a suitable means for the vehicle mounted radar apparatus.

SUMMARY OF THE INVENTION

The present invention is intended to solve the above described problems, and therefore, an object thereof is to provide a low-cost vehicle mounted radar apparatus having high performance, capable of preventing electromagnetic waves from being transferred, or leaked from a transmitter circuit to a receiver circuit, without using any specialized device.

Bearing the above object in mind, according to a first aspect of the present invention, there is provided a vehicle mounted radar apparatus comprising: an oscillator for generating electromagnetic waves; a transmitter for transmitting the electromagnetic waves generated by the oscillator to a target; a receiver for receiving electromagnetic waves reflected from the target; a switch for connecting the transmitter to an antenna during transmission of the electromagnetic waves, and for connecting the antenna to the receiver during reception of the electromagnetic waves; a signal processor for calculating a distance between the vehicle and the target, and also a relative speed between the vehicle and the target based upon the electromagnetic waves transmitted to the target and the electromagnetic waves reflected from the target; and a power supply interrupter for interrupting supply of a voltage to the transmitter. During reception of the electromagnetic waves, the power supply interrupter interrupts the supply of voltage to the transmitter to thereby prevent transfer of the electromagnetic waves from the transmitter to the receiver.

In a form of the first aspect of the invention, the vehicle mounted radar apparatus further comprises: a divider for dividing the electromagnetic waves output from the oscillator, and for transferring part of the divided electromagnetic waves to the transmitter; and a mixer for mixing the other part of the electromagnetic waves divided by the divider with the electromagnetic waves reflected from the target to thereby transfer the mixed electromagnetic waves to the signal processor.

In another form of the first aspect of the invention, the vehicle mounted radar apparatus further comprises: an oscillator output switcher for transferring the electromagnetic waves output from the oscillator to the transmitter during transmission of the electromagnetic waves, and for transferring the electromagnetic waves output from the oscillator to the signal processor during reception of the electromagnetic waves; and a mixer for mixing the electromagnetic waves transferring from the oscillator via the oscillator output switcher with the electromagnetic waves reflected from the target.

According to a second aspect of the present invention, there is provided a vehicle mounted radar apparatus comprising: an oscillator for generating electromagnetic waves; a multiplying transmitter for multiplying the electromagnetic waves generated the oscillator to thereby transmit the multiplied electromagnetic waves to a target; a receiver for receiving electromagnetic waves reflected from the target; a switch for connecting the multiplying transmitter to an antenna during transmission of the electromagnetic waves, and for connecting the antenna to the receiver during reception of the electromagnetic waves; a signal processor for calculating a distance between the vehicle and the target and a relative speed between the vehicle and the target based upon the electromagnetic waves transmitted to and reflected from the target; and a power supply interrupter for interrupting a supply of voltage to the multiplying transmitter. During reception of the electromagnetic waves, the supply of power to the multiplying transmitter is turned off by the power supply interrupter, so that transfer of the electromagnetic waves from the multiplying transmitter to the receiver can be prevented.

In a form of the second aspect of the invention, the vehicle mounted radar apparatus further comprises: a divider for dividing the electromagnetic waves output from the oscillator, and for transferring part of the divided electromagnetic waves to the multiplying transmitter; and an even-harmonic-wave mixer for mixing second harmonic waves of the other divided electromagnetic waves with the electromagnetic waves reflected from the target to thereby transfer the mixed electromagnetic waves to the signal processor.

In another form of the second aspect of the invention, the vehicle mounted radar apparatus further comprises: an oscillator output switcher for transferring the electromagnetic waves output from the oscillator to the multiplying transmitter during transmission of the electromagnetic waves, and for transferring the electromagnetic waves output from the oscillator to the signal processor during reception of the electromagnetic waves; and an even-harmonic-wave mixer for mixing the second harmonic waves of the electromagnetic waves transferred from the oscillator via the oscillator output switcher with the electromagnetic waves reflected from the target.

In a further form of the second aspect of the invention, the multiplying transmitter comprises a transmitter and a multiplier, and the power supply interrupter interrupts the supply of power to the transmitter during reception of the electromagnetic waves.

In a still further form of the second aspect of the invention, the multiplying transmitter comprises a transmitter and a multiplier, and the power supply interrupter interrupts the supply of power to the multiplier during reception of the electromagnetic waves.

In a yet further form of the second aspect of the invention, the multiplying transmitter comprises a transmitter and a multiplier, and the power supply interrupter interrupts the supply of power to the transmitter and the multiplier during reception of the electromagnetic waves.

The above and other objects, features and advantages of the present invention will become more readily apparent from the following detailed description of preferred embodiments of the invention taken in conjunction with the accompanying drawings.

DESCRIPTION OF THE PREFERRED EMBODIMENTS

Now, preferred embodiments of the present invention will be described in detail while referring to the accompanying drawings.

First Embodiment

Figure 1:
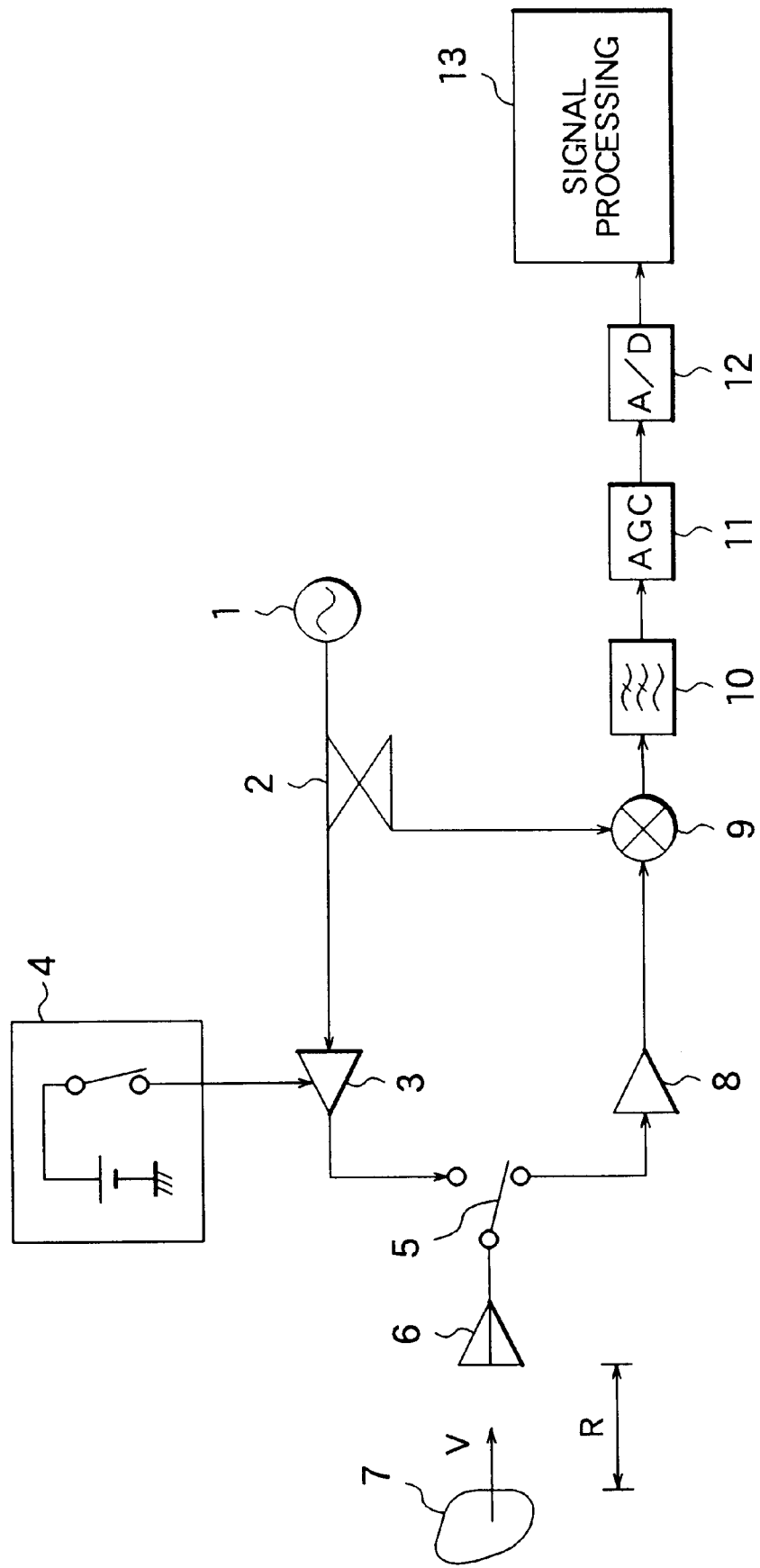
FIG. 1 is a block diagram schematically showing a vehicle mounted radar apparatus in the form of a pulse Doppler radar constructed in accordance with a first embodiment of the present invention.

Referring now to FIG. 1, a first embodiment of the present invention will be described.

FIG. 1 is a block diagram conceptually showing a circuit arrangement of a pulse Doppler radar as a vehicle mounted radar apparatus according to this embodiment of the present invention.

Figure 17:
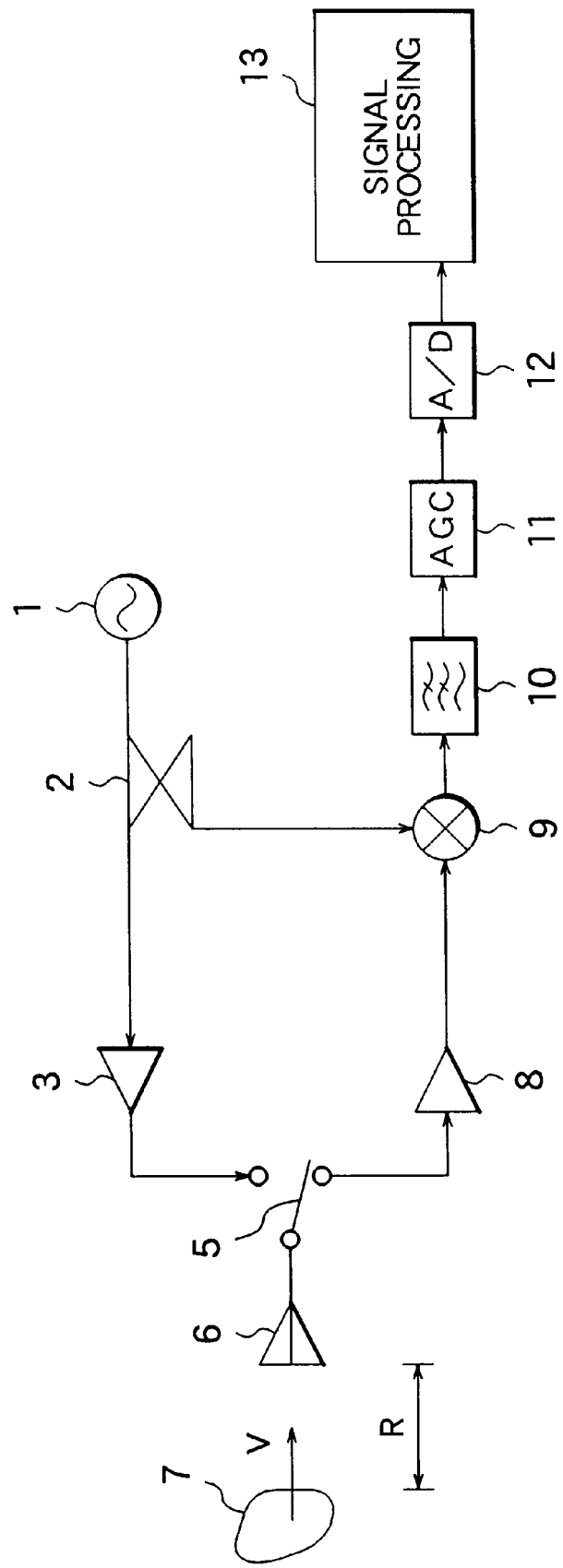
FIG. 17 is a view showing an arrangement of a conventional vehicle mounted radar apparatus.

In FIG. 1, an oscillator 1 generates electromagnetic waves having, for example, a transmission frequency "ftx"=76.5 GHz. A divider in the form of a power divider 2 distributes the power of the electromagnetic waves generated from the oscillator 1 to both a transmitter in the form of a transmitter amplifier 3 and a mixer 9. The transmitter amplifier 3 amplifies the electromagnetic waves distributed by the power divider 2 for transmission. A power supply switch 4 serving as a power supply interrupter supplies the power to the transmitter amplifier 3 during transmission operation, and interrupts power supply to the transmitter amplifier 3 during reception. A switch in the form of a transmitter/receiver changeover switch 5 connects an antenna 6 to the transmitter amplifier 3 during the transmission operation, and also connects the antenna 6 to the receiver amplifier 8 during reception. An antenna in the form of a common transmitter/receiver antenna 6 transmits and receives electromagnetic waves. There is a target (object) 7 having a relative speed "V", which is separated from a radar by a distance "R". A receiver in the form of a receiver amplifier 8 amplifies such electromagnetic waves returned when the transmitted electromagnetic waves are reflected from the target 7. Also, a mixer 9 mixes the electromagnetic waves reflected from the target 7 with the electromagnetic waves supplied from the power divider 2 to a local oscillator (LO) 13, and outputs a beat signal in response to the relative speed V of the target. A filter 10 has a cut-off frequency which becomes an inverse number of a pulse time width. An AGC amplifier 11 has its gain adapted to be controlled in response to the reception power of the reflected electromagnetic waves. An A/D converter 12 converts the beat signal into a digital beat signal. The LO 13 is a signal processor for calculating the distance and relative speed of a target based upon the digital beat signal output from the A/D converter 12. Here, it is to be understood that the arrangements other than the power supply switch 4 are identical to those of the conventional vehicle mounted radar apparatus shown in FIG. 17.

Next, the operation for transmitting electromagnetic waves of the pulse Doppler radar with the above-described arrangement, according to the first embodiment of the present invention, will be described.

First, an electromagnetic waves having a transmission frequency of, for example, ftx=76.5 GHz are output from the oscillator 1. The electromagnetic waves pass through the power divider 2 and are then amplified by the transmitter amplifier 3 which is being supplied with power by the power supply switch 4. Since the transmitter/receiver changeover switch 5 connects the transmitter amplifier 3 with the common transmitter/receiver antenna 6, the electromagnetic waves amplified by the amplifier 3 pass through the transmitter/receiver changeover switch 5, and are then output from the antenna 6.

Next, an electromagnetic wave receiving operation of the first pulse Doppler radar apparatus will be explained.

The transmitter/receiver changeover switch 5 is switched to the reception side (namely, position indicated in FIG. 1) so as to connect the antenna 6 with the receiver amplifier 8 after passage of the a pulse time width "Tg", for instance, Tg=33.3 ns (=1/30 MHz, equal to a distance of 5 m) from the commencement of the electromagnetic wave transmission.

Figure 2:
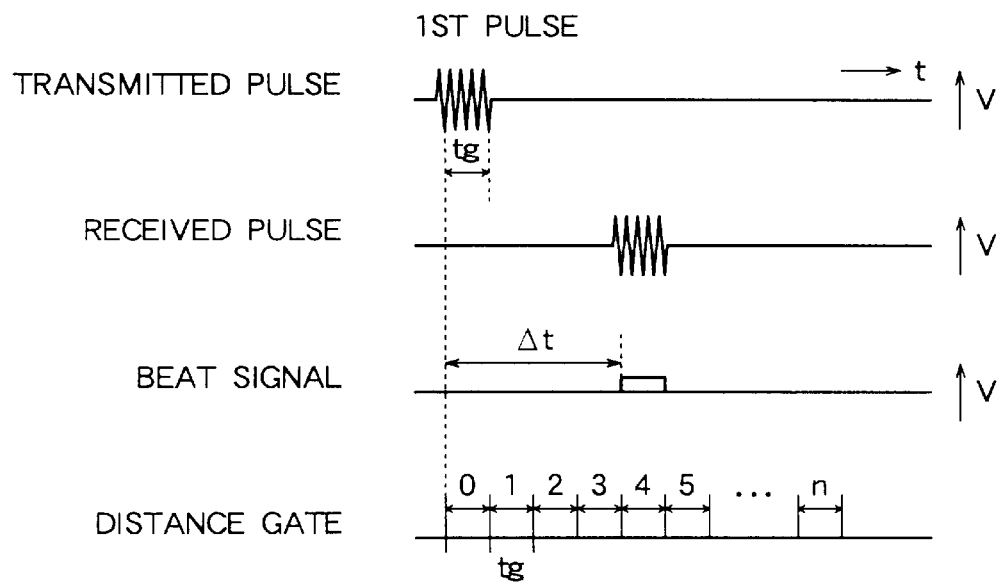
FIG. 2 is a schematic illustration showing one aspect of operating characteristics of the vehicle mounted radar of the present invention and a conventional vehicle mounted radar.
Figure 3:
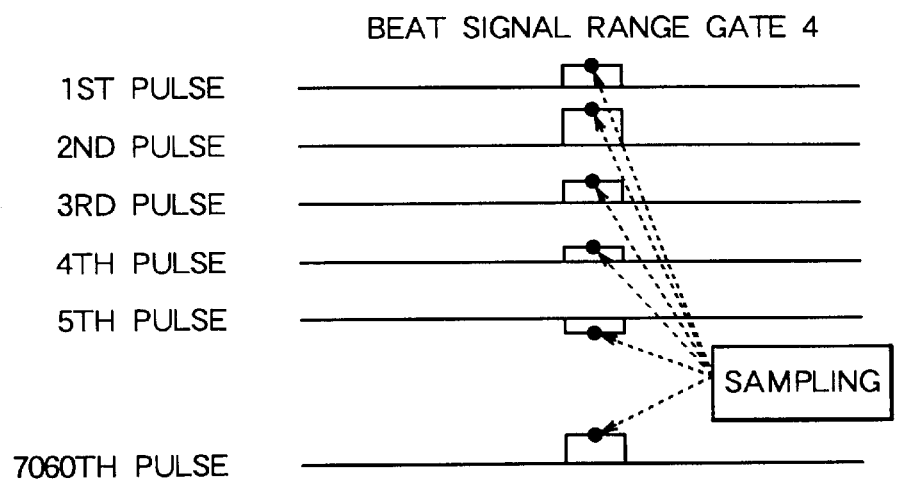
FIG. 3 is a schematic illustration showing another aspect of operating characteristics of the vehicle mounted radar of the present invention and a conventional vehicle mounted radar.
Figure 4:
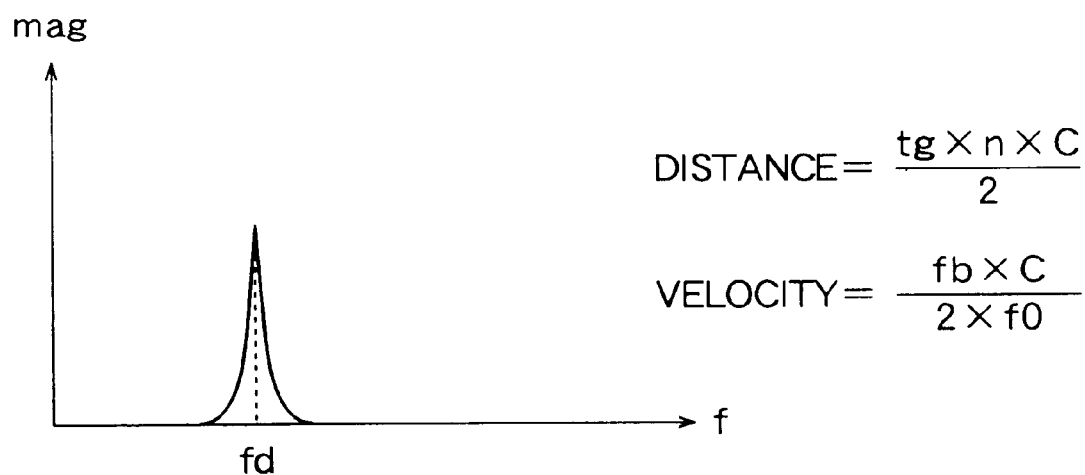
FIG. 4 is a schematic illustration showing a further aspect of operating characteristics of the vehicle mounted radar of the present invention and a conventional vehicle mounted radar.

At the same time, the power supply switch 4 is turned off so as to interrupt the supply of power to the transmitter amplifier 3, so that the amplification of the transmission electromagnetic waves is not carried out. Also, the electromagnetic waves output from the antenna 6 are reflected from the target 7 at a position separated from the pulse Doppler radar apparatus by a distance "R". Then, the reflected electromagnetic waves enter the antenna 6 with a delay time "Δt" depending upon the distance "R" with respect to the transmitted electromagnetic waves (see FIG. 2).

When the target 7 has a relative speed, the frequency of the received electromagnetic waves is Doppler-shifted by "fb" with respect to the frequency "ftx" of the transmitted electromagnetic waves, and the Doppler-shifted electromagnetic waves enter the antenna 6. Then, the electromagnetic waves entering from the antenna 6 are amplified by the receiver amplifier 8, and the amplified electromagnetic waves are mixed by the mixer 9 with electromagnetic waves supplied from the power divider 2 to the LO 13, and a beat signal corresponding to the Doppler shift "fb" is output from the mixer 9 (see FIG. 2). The beat signal output from the mixer 9 is filtered by the filter 10, the cut-off frequency of which is selected to be 30 MHz. The filtered beat signal is amplified by the AGC amplifier 11, and then the amplified beat signal is input into the A/D converter 12.

Also, in response to the data entered from the A/D converter 12, both the distance of the target 7 and the relative speed thereof, calculated by the signal processing apparatus 13, may be expressed by the above-described formulas (2) and (3) which are similar to those for the conventional radar apparatus.

Next, various problems of the conventional vehicle mounted radar apparatus under the following conditions will be explained. That is, while the supply of power to the transmitter amplifier 3 is not stopped by the power supply switch 4 during reception, the amplification operation of the transmission electromagnetic waves is not turned off.

Figure 5:
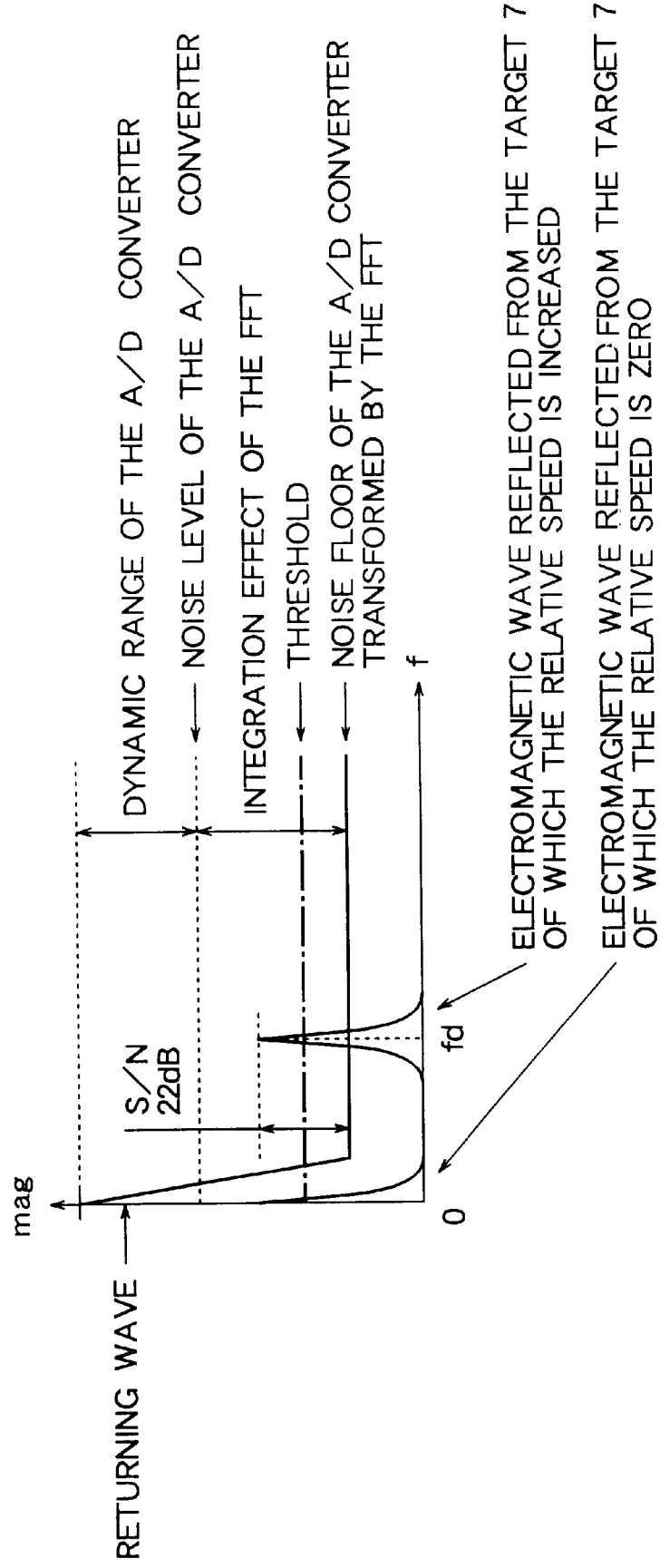
FIG. 5 is a view showing data obtained by a fast Fourier transform of a range gate according to the present invention.

FIG. 5 is a graphic representation of data which has been processed by the fast Fourier transform (FFT) at all of the range gates in the vehicle mounted radar apparatus of the present invention.

As indicated in FIG. 5, when the level of the electromagnetic waves reflected from the target 7 is low, and when the relative speed of the target 7 becomes zero, the spectrum frequency is also zero. When the relative speed is increased, the spectrum frequency is also increased. In comparison thereto, since the level of returning waves is high and not Doppler-shifted, the spectrum frequency becomes zero. The returning waves are input in such a manner that the electromagnetic waves output from the oscillator 1 leak from the transmission system into the reception system during reception. That is, the returning waves correspond to those electromagnetic waves transferred from the transmission system when the electromagnetic waves are received. Also, it is desirable that the noise floor shown in FIG. 5 is originally equal to a thermal noise level.

However, in this case, since the level of the returning waves is excessively high and the AGC amplifier 11 controls such that the level is not saturated by the A/D converter 12, the gain of the AGC amplifier 11 is clipped at a certain gain, irrespective of the reception level of the target vehicle. Consequently, the noise floor is not equal to the level of thermal noise, but becomes a level lower than the level of the returning waves with respect to the noise level of the A/D converter 12 defined by the dynamic range of the A/D converter 12, by the integration number of the fast Fourier transform.

Consequently, the level of the target 7 having a relative speed substantially equal to zero becomes much lower than and is overlapped by the level of the returning waves, so that the target 7 cannot be detected. The condition for detecting a target 7 with a high relative speed is that the level of the target 7 is at least higher than the noise floor. In this case, it is assumed that the maximum sensing distance is equal to the maximum distance at which an S/N ratio can be secured, and this S/N ratio is required when the distance is detected at a pre-selected detection probability higher than a threshold level determined on the basis of a predetermined error warning probability.

Next, the required bit number of the A/D converter, and the maximum sensing distance of the vehicle are obtained by substituting concrete numeral values.

Figure 6:
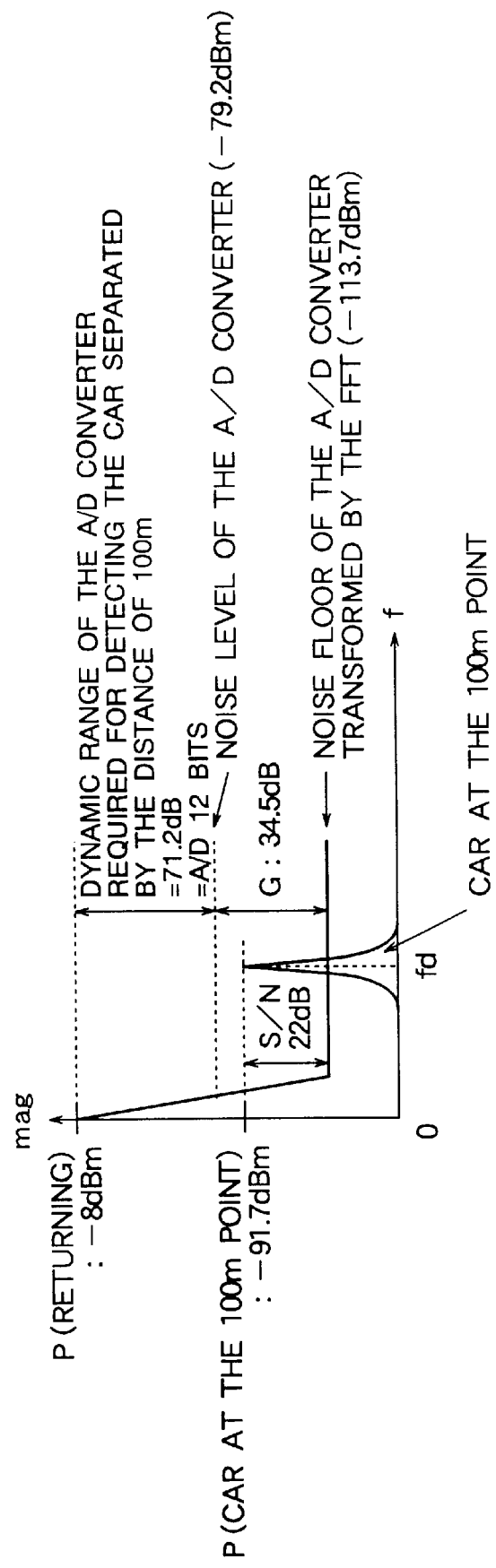
FIG. 6 is a view showing power P (returning) transmitted from a transmitter to a receiver upon reception of electromagnetic waves C.

FIG. 6 is a drawing of a vehicle mounted radar apparatus according to the first embodiment of the present invention showing a power "P" (returning) which is transferred from the transmitter to the receiver during reception.

Figure 7:
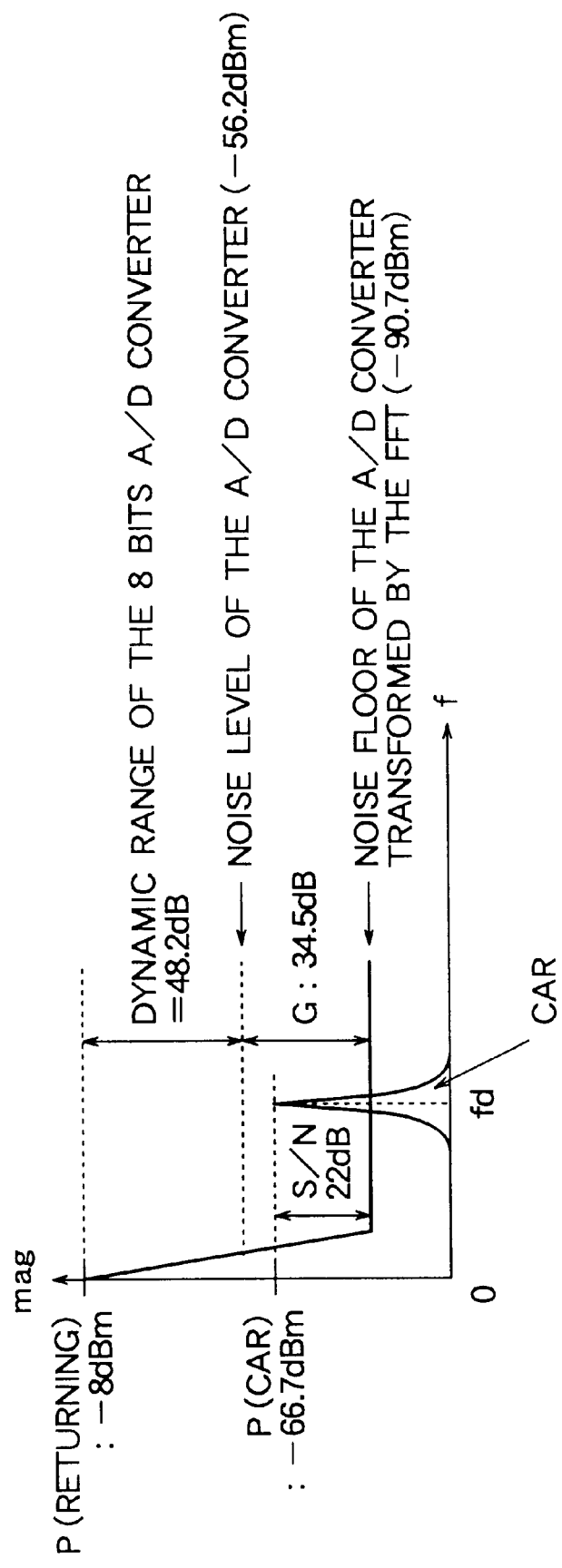
FIG. 7 is a view showing a minimum reception level at an input stage of an antenna in the vehicle mounted radar apparatus according to the first embodiment of the invention.

FIG. 7 is a graphic representation indicating a minimum reception level at the input stage of the antenna employed in the vehicle mounted radar apparatus according to the first embodiment of the present invention.

Figure 8:
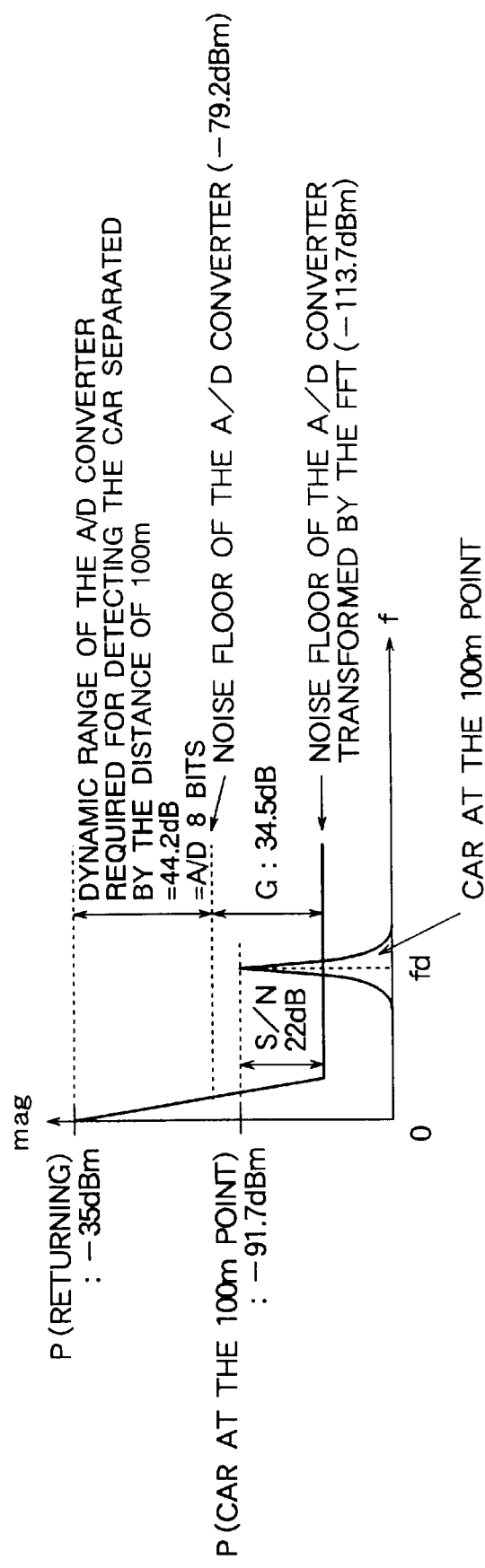
FIG. 8 is a characteristic view of a dynamic range of an A/D converter required for detecting a target while interrupting power supply to the transmitter in the vehicle mounted radar apparatus according to the first embodiment of the invention.

FIG. 8 is a graph showing a dynamic range of the A/D converter necessary to detect the target while the power supply of the transmitter is turned off, employed in the vehicle mounted radar apparatus according to the first embodiment of the present invention.

Figure 9:
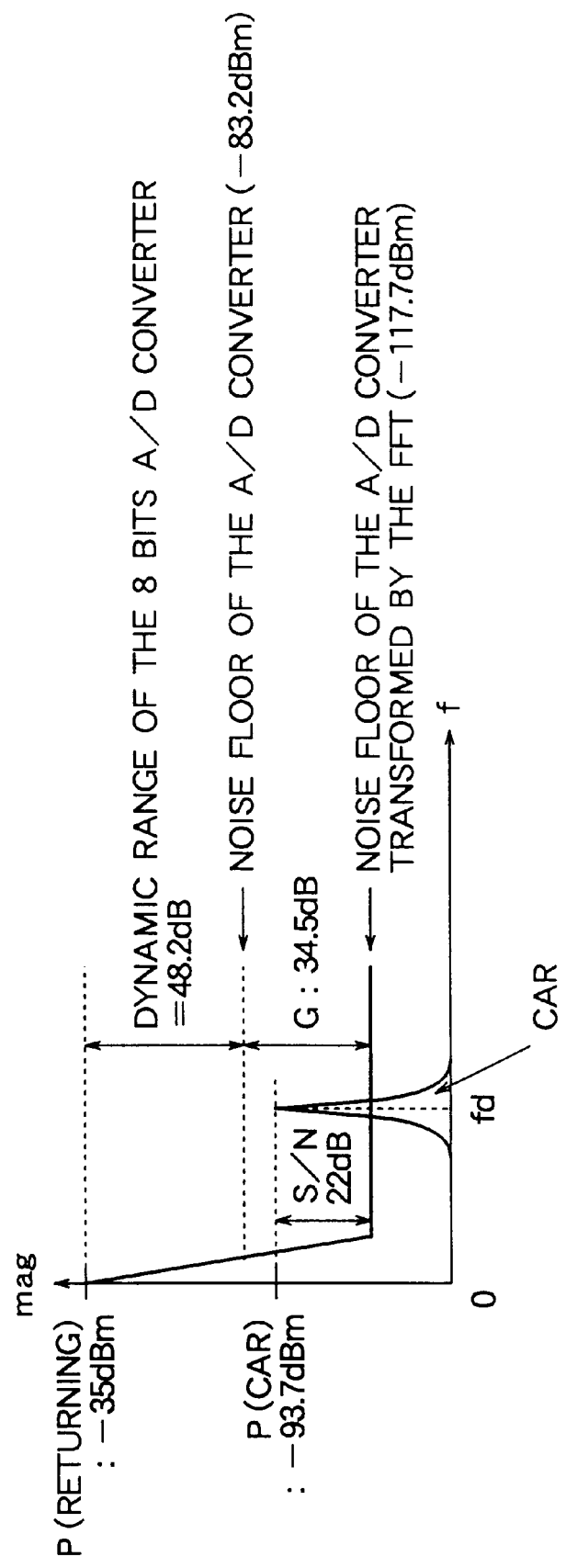
FIG. 9 is a view showing a minimum reception level in the vehicle mounted radar apparatus according to the first embodiment of the invention.

FIG. 9 is a graph showing a minimum reception level in the vehicle mounted radar apparatus according to the first embodiment of the present invention.

In this connection, let us assume that during transmission, in FIG. 1, the transmission power input into the transmitter/receiver changeover switch 5 be equal to 12 dBm when the transmission power at the feed point of the antenna 6 is selected to be 10 dBm, and the isolation of the transmitter/receiver changeover switch 5 be selected to be −20 dB, and loss be selected to be 2 dB. With this assumption, the power "P" (returning) transferred from the transmitter amplifier 3 to the receiver amplifier 8 during reception is defined as indicated in FIG. 6 as follows:

P (returning)=(transmission power entering the transmitter/receiver changeover switch 5)−(isolation of transmitter/receiver changeover switch 5)=12 dBm−20 dB=−8 dBm.

Also, a radar target reception power equation is expressed by formula (4):

$$Pr = PtG^2\lambda^2\sigma/(4\pi)^3 R^4 \quad (4)$$

where symbol "Pr" indicates reception power at the antenna 6; symbol "Pt" shows transmission power at the antenna 6; symbol "G" indicates the gain of the antenna 6; symbol "λ" shows the wavelength of the transmitted electromagnetic waves; symbol "σ" represents effective reflection area of the target; and symbol "R" is the distance to the target.

The maximum sensing distance of this pulse Doppler radar with respect to a car is designed to be 100 m. The antenna end reception power "Pr" for a car separated by a distance of 100 m is given as Pr=−89.7 dBm when Pt=10 dBm, G=25.7 dB (equivalent to an antenna diameter of 38 mm and antenna efficiency of 40%), σ=10 dB (equivalent to a car), and R=100 m are substituted in the above-described formula (4). As indicated in FIG. 6, reception power "P" (car separated by a distance of 100 m) entering the receiver amplifier 8 is defined as follows:

P (car separated by a distance of 100 m)=(antenna end reception power of the car separated by a distance of 100 m)−(loss in the transmitter/receiver changeover switch 5)=−89.7 dBm−2 dB=−91.7 dBm.

Since 7060 pulses of this signal are acquired, the integration effect during the fast Fourier transform becomes:

10 log (7060)=38.5 dB.

Furthermore, the overall integration effect "G" is given as follows:

G=38.5 dB−4 dB=34.5 dB, under such a condition that the losses caused by the random reflection, atmospheric loss, and the fast Fourier transform are approximately 4 dB. This includes the integration effects with respect to P (returning) and P (car separated by a distance of 100 m), and does not include the integration effect with regard to the noise. Consequently, it is conceivable that only the levels P (returning) and P (car separated by a distance of 100 m) are increased by G. Conversely, as shown in FIG. 6, it is also conceivable that the 34.5 dB noise level is decreased.

As shown in FIG. 6, the dynamic range of the A/D converter, required to detect the car separated by the distance of 100 m, assuming that an S/N ratio required to sense the car at a predetermined detection probability and predetermined error detection probability is selected to be 22 dB, is as follows:

(necessary A/D dynamic range)=P (returning)−(P (car separated by a distance of 100 m)−S/N ratio+G)=−8 dBm−(−91.7 dBm−22 dB+34.5 dB)=71.2 dB.

In order to detect a car with a high relative speed separated by a distance of 100 m, the necessary bit number of the A/D converter is defined as follows:

(A/D bit number)=(required AND dynamic range)/(20/log 2)=12. Consequently, the A/D converter having not less than 12 bits is required. Such an A/D converter is expensive, resulting in an increase in the cost of the vehicle mounted radar apparatus.

Conversely, if an 8-bit A/D converter is used which has a dynamic range of merely 48.2 dB, the minimum reception level "Pr (min)" at the input stage of the antenna 6 is given as follows (see FIG. 7):

Pr(min)=P (returning)−(dynamic range of 8-bit A/D converter)−G+S/N ratio+(loss of transmitter/receiver changeover switch 5)=−8 dBm−48.2 dB−34.5 dB+22 dB+2 dB=−66.7 dBm.

Consequently, the maximum sensing distance "R" of the car calculated from the formula (4) becomes 26.5 m.

Next, a description will be made of the case wherein the power supply of the transmitter amplifier 3 is turned off by the power supply switch 4 during reception.

When the gain of the transmitter amplifier 3 is selected to be 7 dB and a 20 dB isolation of the transmitter amplifier 3 with the power supply thereof being turned off can be secured, the transmission power P (returning) input into the receiver amplifier 8 is defined as shown in FIG. 8 as follows:

P (returning)=(transmission power entering transmitter/receiver changeover switch 5)−(isolation of transmitter/receiver changeover switch 5)−(gain of transmitter amplifier 3)−(isolation of transmitter amplifier 3)=12 dBm−20 dB−7 dB−20 dB=−35 dBm.

In this case, the necessary dynamic range of the A/D converter is defined by:

(necessary AID dynamic range)=P (returning)−(P (car separated by a distance of 100 m)−S/N ratio+G)=−35 dBm−(−91.7 dBm−22 dB+34.5 dB)=44.2 dB.

In order to detect a car separated by the distance of 100 m, the following bit number of the A/D converter is required:

(AID bit number)=(necessary A/D dynamic range)/(20/log 2)=8.

Consequently, A/D converters having at least 8 bits may be employed to detect a car separated by a distance of 100 m.

Conversely, when an 8-bit A/D converter is used, since the dynamic range thereof is merely 48.2 dB, the minimum reception level "Pr (min)" at the input stage of the antenna 6 is given as follows (see FIG. 9):

Pr(min)=P (returning)−(dynamic range of 8-bit A/D converter)−G+S/N ratio+(loss of transmitter/receiver changeover switch 5)=−35 dBm−48.2 dB−34.5 dB+22 dB+2 dB=−93.7 dBm.

Consequently, the maximum sensing distance "R" of the car calculated from the formula (4) becomes 125.4 m. This maximum sensing distance becomes approximately 4.7 times longer than the distance (R=26.5 m) obtained when the power supply switch 4 is not employed.

As explained above, with the vehicle mounted radar apparatus according to the first embodiment of the present invention, the power supply of the transmitter amplifier 3 is turned off by the power supply switch 4 (namely, the supply of power to the transmitter amplifier 3 is turned off). Consequently, the electromagnetic waves output from the oscillator 1 can be prevented from returning from the transmission system to reception system. Therefore, the maximum sensing distance can be increased even while using the A/D converter having the same bit number, so that the performance of the vehicle mounted radar apparatus can be considerably improved. Also, when the maximum sensing distance for a car of the vehicle mounted radar apparatus is set to 100 m, the bit number of the A/D converter can be reduced, so that a low-cost a vehicle mounted radar apparatus can be manufactured.

Moreover, in order to interrupt the power supply of the transmitter amplifier 3, the negative voltage on the gate side of the FET employed in the transmitter amplifier 3 may be increased (for example, between −0.2 V and −3 V). Alternatively, the voltage on the drain side of the FET may be decreased (for instance, between 3V and 0V). Additionally, both these voltage controls may be carried out at the same time.

Second Embodiment

Figure 10:
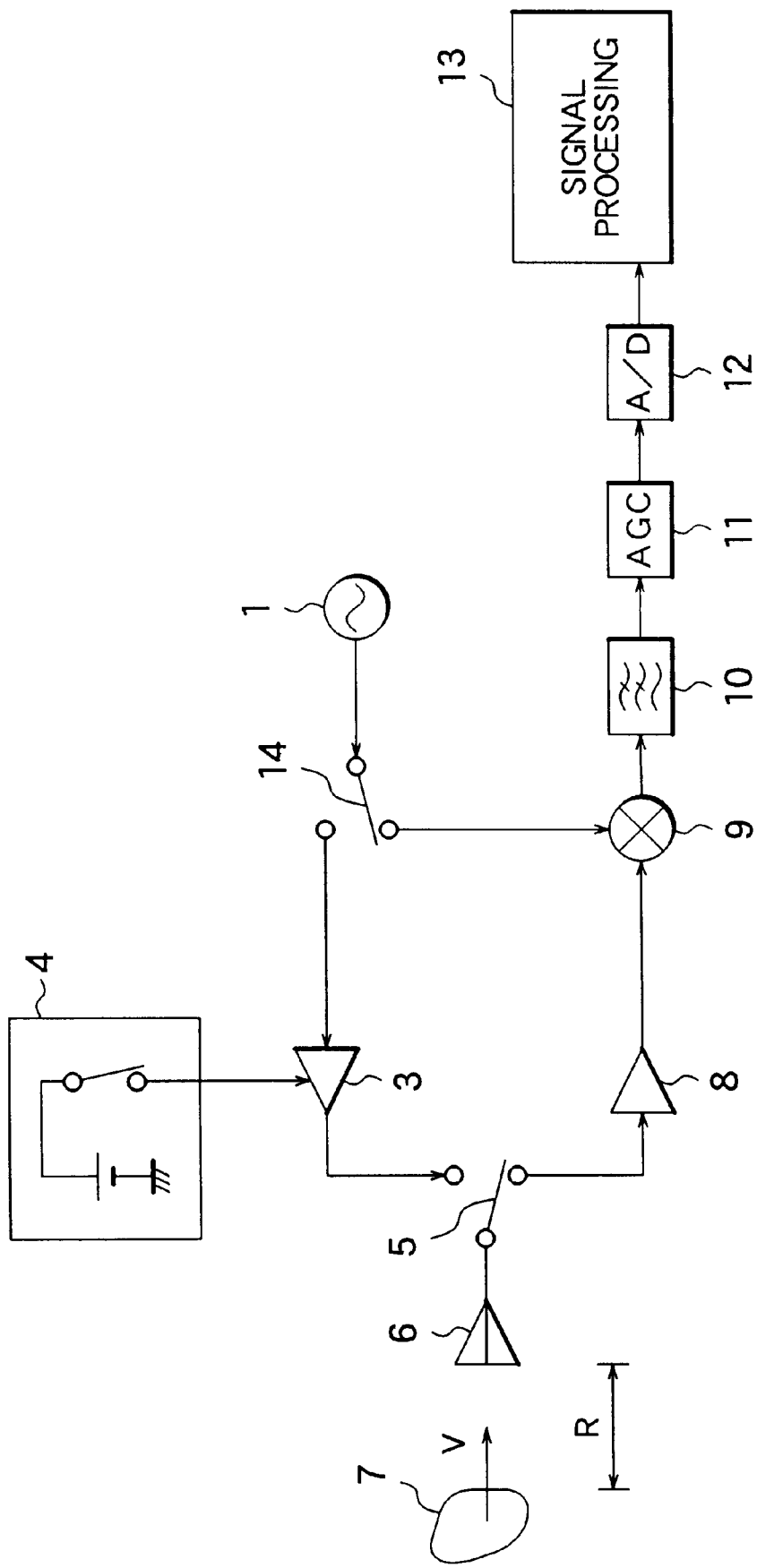
FIG. 10 is a block diagram schematically illustrating a circuit arrangement of another vehicle mounted radar in the form of a pulse Doppler radar in accordance with a second embodiment of the present invention.

Referring now to FIG. 10, an the second embodiment of the present invention will be described.

FIG. 10 is a block diagram conceptually showing a circuit arrangement of a pulse Doppler radar as a vehicle mounted radar apparatus according to this the second embodiment of the present invention.

Figure 11:
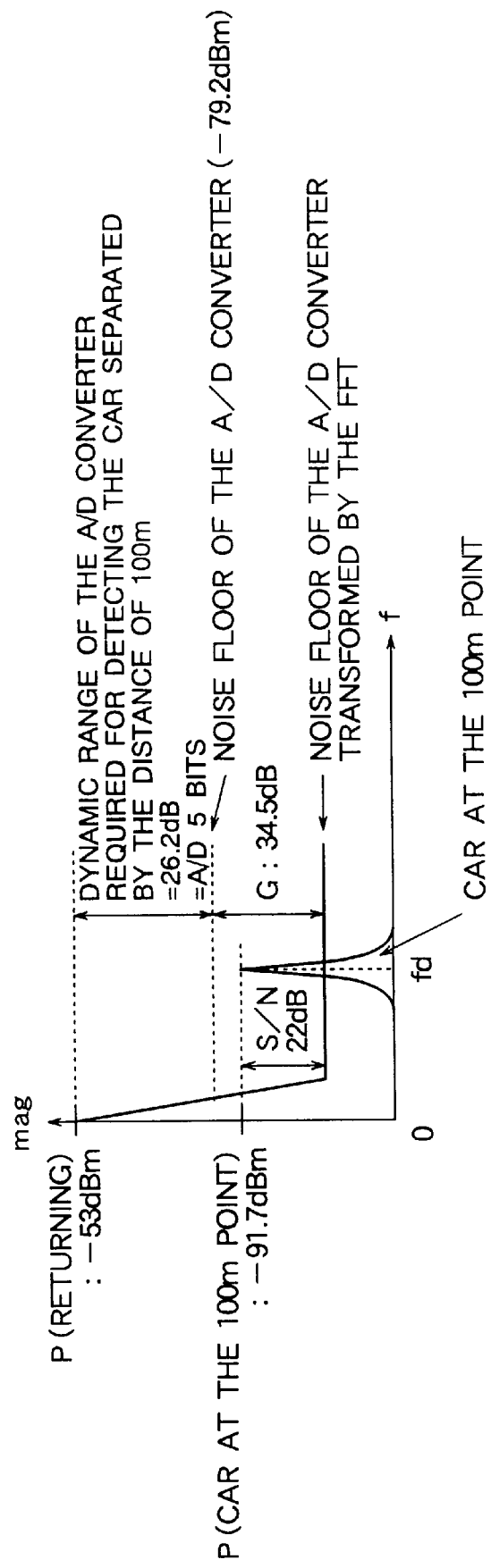
FIG. 11 is a characteristic view of a dynamic range of an A/D converter required for detecting a target while interrupting power supply to the transmitter in the vehicle mounted radar apparatus according to the second embodiment of the invention.

FIG. 11 is a graph representing characteristics of a dynamic range of an AID converter, required to detect a target while the power supply of a transmitter is turned off, in accordance with a second embodiment of the present invention.

Figure 12:
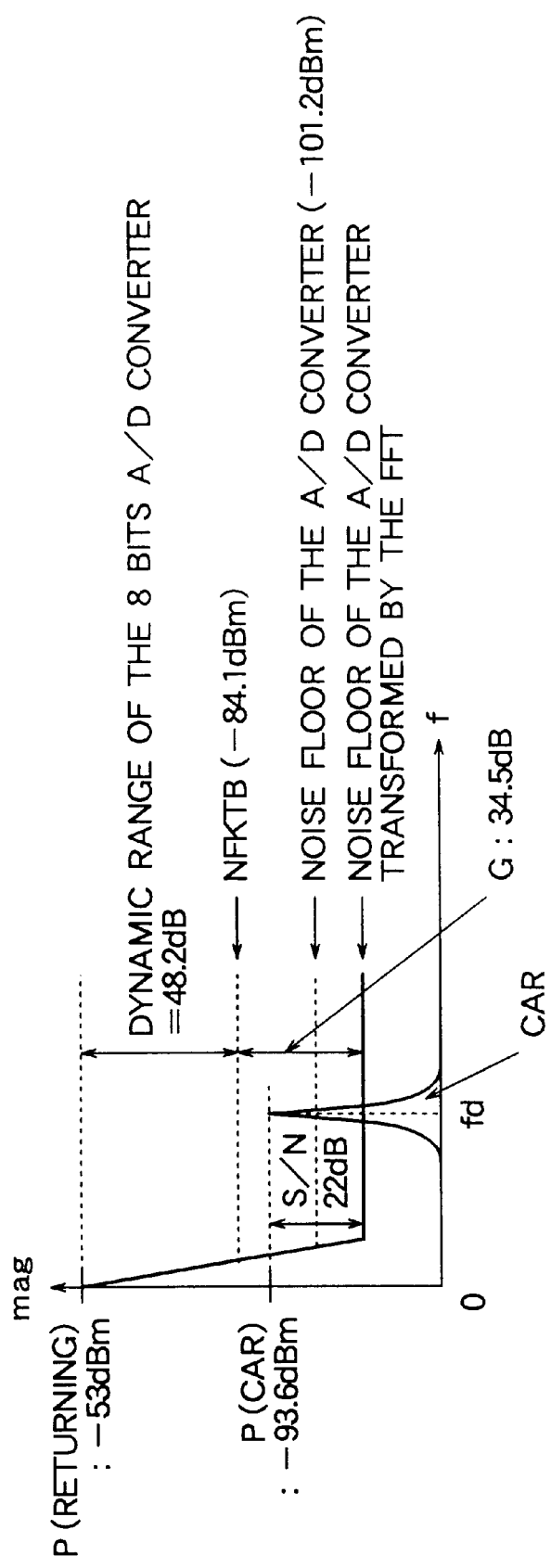
FIG. 12 is a view showing a minimum reception level in the vehicle mounted radar apparatus according to the second embodiment of the invention.

FIG. 12 is a graph showing characteristics of a minimum reception level in the vehicle mounted radar apparatus according to the second embodiment of the present invention.

As shown in FIG. 10, the vehicle mounted radar apparatus according to this second embodiment of the present invention is equipped with an oscillator output selector 14 as an oscillator output switcher instead of the above-described power divider employed in the first embodiment. Accordingly, since the arrangements other than the oscillator output selector 14 are the same as those of the first embodiment (see FIG. 1), explanations thereof are omitted.

The oscillator output selector 14 is such an oscillator output changeover switch whereby the circuit is connected to supply power of electromagnetic waves produced by the oscillator 1 to the transmitter amplifier 3 during transmission, and the power of the electromagnetic waves generated by the oscillator 1 to the mixer 9 during reception.

Also, the mixer 9 mixes the electromagnetic waves supplied from changeover switch 14 to the LO 13 with electromagnetic waves reflected from the target 7 to thereby produce a beat signal in response to the relative speed V of the target 7.

Next, the transmission operation of electromagnetic waves of the pulse Doppler radar with the above-described arrangement, according to the second embodiment of the present invention, will be described.

First, electromagnetic waves having a transmission frequency of, for example, ftx=76.5 GHz are output from the oscillator 1. These electromagnetic waves pass through the oscillator output changeover switch 14 connected to the transmitter amplifier 3 and are then amplified by the transmitter amplifier 3, supplied with power by the power supply switch 4. Since the transmitter/receiver changeover switch 5 connects the transmitter amplifier 3 with the common transmitter/receiver antenna 6, the electromagnetic waves amplified by the amplifier 3 pass through the transmitter/receiver changeover switch 5, and are thereafter output from the antenna 6 to the surrounding environment.

Next, the electromagnetic wave receiving operation will be explained.

The transmitter/receiver changeover switch 5 is switched to the reception side so as to connect the antenna 6 with the receiver amplifier 8 after the passage of a pulse time width "Tg", for instance, Tg=33.3 ns (=1/30 MHz, equal to a distance of 5 m) from the commencement of the electromagnetic wave transmission. At the same time, the oscillator output changeover switch 14 is switched to the reception side in order to connect the oscillator 1 with the mixer 9. Also at the same time, the voltage supplied to the transmitter amplifier 3 is cut off by the power supply switch 4, so that the amplification of the transmission electromagnetic waves is turned off. Also, the electromagnetic waves output from the antenna 6 are reflected from the target 7 existing at a position separated from the vehicle mounted radar apparatus by a distance "R". Then, the reflected electromagnetic waves enter the antenna 6, with a delay time "Δt" depending upon the distance R with respect to the transmitted electromagnetic waves (see FIG. 2).

When the target has a relative speed, the frequency of the received electromagnetic waves is Doppler-shifted by "fb" with respect to the frequency "ftx" of the transmitted electromagnetic wave, and the Doppler-shifted electromagnetic waves enter into the antenna 6. Then, the electromagnetic waves entering from the antenna 6 are amplified by the receiver amplifier 8, and the amplified electromagnetic waves are mixed by the mixer 9 with electromagnetic waves supplied from the oscillator output changeover switch 14 to the LO 13. A beat signal corresponding to the Doppler shift fb is output from the mixer 9 (see FIG. 2). The beat signal output from the mixer 9 is filtered by the filter 10, the cut-off frequency of which is selected to be 30 MHz. The filtered beat signal is amplified by the AGC amplifier 11, and then the amplified beat signal is input into the A/D converter 12.

Here, the maximum sensing distance of the pulse Doppler radar with respect to a car is designed as 100 m. The antenna end reception power "Pr" for the car separated by the distance of 100 m is given as Pr=−89.7 dBm when Pt=10 dBm, G=25.7 dB (equivalent to an antenna diameter of 38 mm, and an antenna efficiency of 40%), σ=10 dB (equivalent to a car), and R=100 m are substituted in the above-described formula (4).

As indicated in FIG. 11, reception power "P" (car separated by a distance of 100 m) entering the receiver amplifier 8 is defined similar to the first embodiment as follows:

P (car separated by a distance of 100 m)=(antenna end reception power of the car separated by a distance of 100 m)−(loss in transmitter/receiver changeover switch 5)=−89.7 dBm−2 dB=−91.7 dBm.

Next, a calculation is made of the power "P" (returning) of the transmission power returning to the receiver amplifier 8 during reception. In FIG. 10, let us assume that during transmission of the electromagnetic waves, the transmission power at the feed point of the antenna 6 be selected to be 10 dBm; the gain of the transmitter amplifier 3 be selected to be 7 dB; the isolation of the transmitter amplifier 3 with the power supply thereof being turned off be selected to be 20 dB; the losses of the transmitter/receiver changeover switch 5 and the oscillator output changeover switch 14 be selected to be 2 dB; and the isolation be selected to be 20 dB. In this case, the output power "Posc" of the oscillator 1 is defined as follows:

Posc=(transmission power at feed point of antenna 6)+(loss in transmitter/receiver changeover switch 5)−(gain of transmitter amplifier 3)+(loss of oscillator output changeover switch)=10 dBm+2 dB−7 dB+2 dB=7 dBm.

Consequently, as represented in FIG. 11, transmission power "P" (returning) entering the receiver amplifier 8 during reception is given as follows:

P (returning)=(output power of oscillator 1)−(isolation of oscillator output changeover switch 14)−(isolation of transmitter amplifier 3)−(isolation of transmitter/receiver changeover switch 5)=7 dBm−20 dB−20 dB−20 dB=−53 dBm.

In this case, the necessary dynamic range of the A/D converter is defined as shown in FIG. 11:

(necessary A/D dynamic range)=P (returning)−(P (car separated by a distance of 100 m)−S/N ratio+G)=−53 dBm−(−91.7 dBm−22 dB+34.5 dB)=26.2 dB.

In order to detect the car separated by the distance of 100 m, the following bit number of the A/D converter is required:

(A/D bit number)=(necessary A/D dynamic range)/(20/log 2)=5.

Consequently, A/D converters having not less than 5 bits may be employed so as to detect the car separated by the distance of 100 m.

Accordingly, the cost of the vehicle mounted radar apparatus can be considerably reduced.

Moreover, compared with that of the vehicle mounted radar apparatus according to the first embodiment, the bit number of the A/D converter in accordance with the vehicle mounted radar apparatus of the second embodiment can be lowered.

Also, when an 8-bit A/D converter is used in the vehicle mounted radar apparatus according to the second embodiment, since the dynamic range is 48.2 dB, a noise level "N(AD)" of the 8-bit A/D converter is defined as shown in FIG. 12 as follows:

N(AD)=P (returning)−(8-bit A/D dynamic range)=−53 dBm−48.2 dB=−101.2 dBm.

In this case, thermal noise may be expressed by "NFKTB". Assuming now that NF of the receiver=15 dB; KT=173.9 dBm; and B=30 MHz, thermal noise may be calculated as follows:

$$NFKTB=NG+KT+B$$

That is, NFKTB=15 dB−173.9 dBm+74.8 dB=−84.1 dBm. Consequently, since NFKTB>N(AD), it can be seen that the noise floor of this thermal noise becomes dominant with respect to the minimum reception level.

As is apparent from the foregoing description, a minimum reception level "Pr (min)" at the input stage of the antenna 6 is given as follows;

Pr(min)=NFKTB−G+S/N ratio+(loss of transmitter/receiver changeover switch 5)=−84.1 dB−34.5 dB+22 dB+2 dB=−94.6 dBm. Consequently, the maximum sensing distance "R" for a car from the formula (4) becomes 132.51 m. This maximum sensing distance is 5 times longer than the distance obtained when the power supply of the transmitter amplifier 3 is not turned off.

As previously explained, with the vehicle mounted radar apparatus according to the second embodiment of the present invention, the power supply of the transmitter amplifier 3 is turned off by the power supply switch 4 (namely, the supply of power to the transmitter amplifier 3 is turned off), and further, the oscillator output changeover switch 14 is employed. Consequently, returning of the electromagnetic waves output from the oscillator 1 can be prevented from returning from the transmission system to reception system. Therefore, as compared to the case when the power supply of transmitter amplifier 3 is not turned off, the maximum sensing distance can be increased while using the A/D converter having the same bit number, and the performance of the vehicle mounted radar apparatus can be considerably improved.

Also, when the maximum sensing distance of the vehicle mounted radar apparatus with respect to the car is set to 100 m, since the bit number of the A/D converter can be reduced in comparison with such a case that the power supply of the transmitter amplifier 3 is not turned off, a low-cost vehicle mounted radar apparatus can be manufactured. Moreover, in general, input impedance of the transmitter amplifier 3 will be changed by turning the power supply of the transmitter amplifier 3 on and off. However, since the oscillator output changeover switch 14 is employed, the adverse influences on the output power and oscillation frequency of the oscillator can be minimized. It should also be noted that even when the transmitter/receiver changeover switch 5 is replaced by a circulator, a similar effect may be achieved.

Third Embodiment

Figure 13:
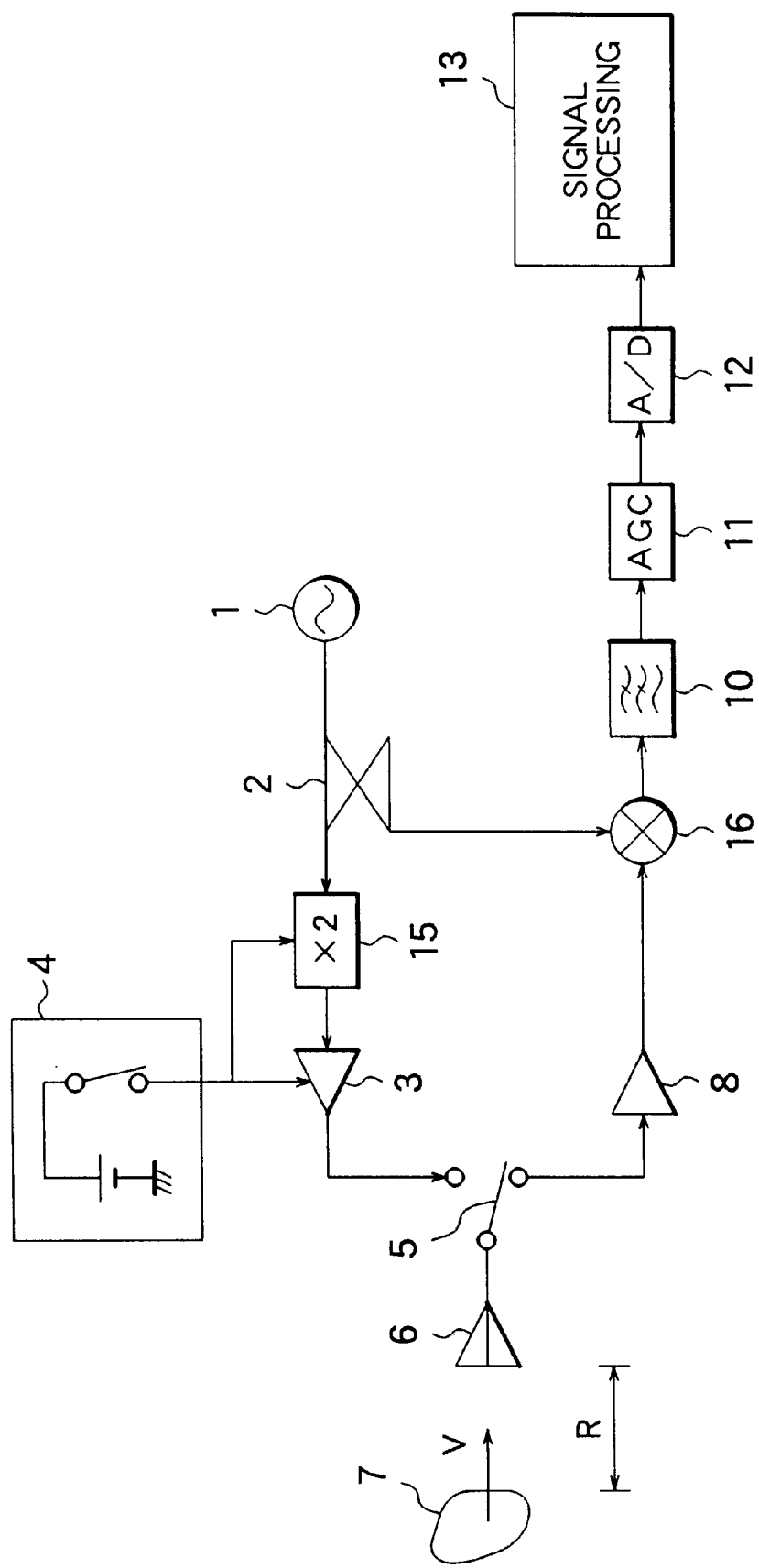
FIG. 13 is a block diagram schematically illustrating a circuit arrangement of a further vehicle mounted radar in the form of a pulse Doppler radar in accordance with a third embodiment of the present invention.

Referring now to FIG. 13, a third embodiment of the present invention will be described.

FIG. 13 is a block diagram showing a circuit arrangement of a pulse Doppler radar as a vehicle mounted radar apparatus according to the third embodiment of the present invention.

Figure 14:
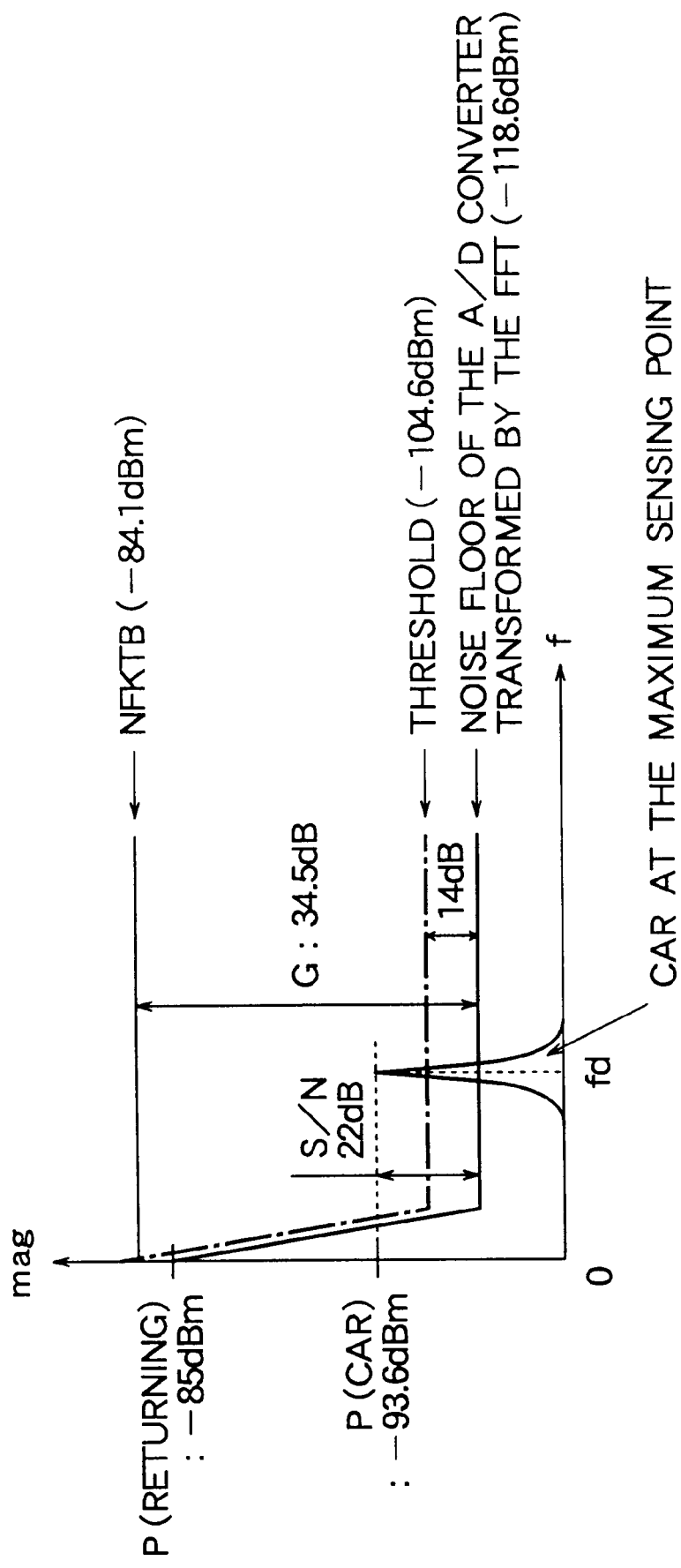
FIG. 14 is a view showing a minimum reception level in the vehicle mounted radar apparatus according to the third embodiment of the invention.

FIG. 14 is a graph indicating characteristics of minimum reception level in the vehicle mounted radar apparatus according to the third embodiment of the present invention.

The vehicle mounted radar apparatus according to the third embodiment is equipped with an oscillator 1 for generating electromagnetic waves having a transmission frequency ftx=38.25 GHz. Without employing a doubler (two times multiplier), this transmission frequency is equal to half of the transmission frequency (ftx=76.5 GHz) of the oscillator 1 employed in the vehicle mounted radar apparatus according to embodiments 1 and 2.

Also, as indicated in FIG. 13, a doubler 15 as a multiplier is provided between the power divider 2 and the transmitter amplifier 3 in the first embodiment (see FIG. 1).

Moreover, both the transmitter amplifier 3 acting as the transmitter and the doubler 15 acting as the multiplier will constitute a multiplying transmitter.

Other arrangements of this vehicle mounted radar apparatus are similar to those of the first embodiment, and descriptions thereof are omitted.

The doubler 15 multiplies by two the frequency of the electromagnetic waves, distributed from the power divider 2 for the transmission. Since the doubler 15 is provided in this vehicle mounted radar apparatus, the power divider 2 distributes the power of the electromagnetic waves generated from the oscillator 1 into both the doubler 15 and an even-harmonic-wave mixer 16. The transmitter amplifier 3 amplifies the electromagnetic wave doubled by the doubler 15.

Moreover, the even-harmonic-wave mixer 16 mixes even harmonic waves of electromagnetic waves having a frequency equal to half of the transmission frequency of the electromagnetic waves supplied from the power divider 2 to the LO 13 with waves reflected from the target 7 to thereby output a beat signal in response to the relative speed V of the target.

Next, the transmission operation of electromagnetic waves of the pulse Doppler radar with the above-described arrangement, according to the third embodiment of the present invention, will be described.

First, electromagnetic waves having a transmission frequency of, for example, ftx=38.25 GHz are output from the oscillator 1. Namely, this transmission frequency is equal to half of the transmission frequency of ftx=76.5 GHz. The electromagnetic waves passing through the power divider 2, are doubled by the doubler 15 and then amplified by the transmitter amplifier 3 supplied with power by the power supply switch 4. Since the transmitter/receiver changeover switch 5 connects the transmitter amplifier 3 with the common transmitter/receiver antenna 6, the electromagnetic waves amplified by the amplifier 3 pass through the transmitter/receiver changeover switch 5, and are thereafter output from the antenna 6 to the surrounding environment.

Next, the electromagnetic wave receiving operation will be explained.

The transmitter/receiver changeover switch 5 is switched to the reception side so as to connect the antenna 6 with the receiver amplifier 8 after the passage of a pulse time width "Tg", for instance, Tg=33.3 ns (=1/30 MHz, equal to a distance of 5 m) from the commencement of the electromagnetic wave transmission. At the same time, the power supply switch 4 is turned off so as to interrupt the supply of power to the transmitter amplifier 3 and the doubler 15, and the amplification of the transmission electromagnetic waves is not carried out. Also, the electromagnetic waves output from the antenna 6 are reflected from the target 7 existing at a position separated from the pulse Doppler radar apparatus by a distance "R". Then, the reflected electromagnetic waves enter the antenna 6 with a delay time "t" depending upon the distance R with respect to the transmitted electromagnetic waves (see FIG. 2).

When the target has a relative speed, the frequency of the received electromagnetic waves is Doppler-shifted by "fb" with respect to the frequency "ftx" of the transmitted electromagnetic waves, and the Doppler-shifted electromagnetic waves enter the antenna 6. Then, the electromagnetic waves entering from the antenna 6 are amplified by the receiver amplifier 8, and the amplified electromagnetic waves are mixed with electromagnetic waves supplied from the power divider 2 to the LO 13 by the even-harmonic-wave mixer 16. A beat signal corresponding to the Doppler shift fb is output from the mixer 9 (see FIG. 2). The beat signal output from the even-harmonic wave mixer 16 is filtered by the filter 10, the cut-off frequency of which is selected to be 30 MHz. The filtered beat signal is amplified by the AGC amplifier 11, and then the amplified beat signal is input into the A/D converter 12.

Next, a calculation is made of power "P" (returning) of the transmission power returned to the receiver amplifier 8 during reception. In FIG. 13, let us assume that during transmission of the electromagnetic waves, the transmission power at the feed point of the antenna 6 be selected to be 10 dBm; the gain of the transmitter amplifier 3 be selected to be 14 dB; the loss of the doubler 15 be selected to be 7 dB; the isolation of the doubler 15 whose power supply is turned off be selected to be 50 dB; the isolation of the transmitter amplifier 3 with the power supply thereof being turned off be selected to be 20 dB; the losses of the transmitter/receiver changeover switch 5 and the oscillator output changeover switch 14 be selected to be 2 dB; and the isolation is selected to be 20 dB. In this case, the transmission power "P" (returning) entering the receiver amplifier 8 during reception is defined as follows:

P (returning)=(transmission power entering transmission/reception changeover switch 5)–(isolation of transmission/reception changeover switch 5)–(gain of transmitter amplifier 3)–(isolation of transmitter amplifier 3)–(gain of doubler 15)–(isolation of doubler 15)=12 dBm–20 dB–14dB–20 dB–(–7 dB)–50 dB=–85 dBm.

In this case, the reason why the isolation (namely 50 dB) of the doubler 15 becomes larger than the isolation (namely, 20 dB) of the transmitter amplifier 3 is that substantially no doubled wave is produced when the power supply is turned off.

Also, when an 8-bit A/D converter is used in the vehicle mounted radar apparatus according to the third embodiment, since the dynamic range is 48.2 dB, a noise level "N(AD)" of the 8-bit A/D converter is defined as follows:

N(AD)=P (returning)–(8-bit A/D dynamic range)=–85 dBm–48.2 dB=–133.2 dBm.

In this case, thermal noise may be expressed by "NFKTB". Assuming now that NF of the receiver=15 dB; KT=173.9 dBm; and B=30 MHz, thermal noise may be calculated as follows:

NFKTB=15 dB–173.9 dBm–74.7 dB=–84.1 dBm. Consequently, since NFKTB>N(AD), it can be seen that the noise floor of this thermal noise becomes dominant with respect to the minimum reception level.

When the 8-bit A/D converter is used, a minimum reception level "Pr (min)" at the input stage of the antenna 6 is given as follows:

Pr (min)=NFKTB–G+S/N ratio+(loss of transmitter/receiver changeover switch 5)=–84.1 dB–34.5 dB+22 dB+2 dB=–94.6 dBm.

Consequently, the maximum sensing distance "R" of a car from the formula (4) becomes 132.5 m. This maximum sensing distance becomes 5 times longer than the distance obtained when the power supply of the transmitter amplifier 3 of the first embodiment is not turned off. This maximum sensing distance is identical to that of the second embodiment. It should be noted that since P (returning) is smaller than that of the first embodiment and the second embodiment, it is possible to detect a vehicle having a relative speed of zero by controlling the threshold level.

For instance, as indicated in FIG. 14, the threshold level is set high only at f=0 or thereabout, and at other values of "f" it may be determined from the noise floor after being transformed by the fast Fourier transform.

In accordance with the vehicle mounted radar apparatus of the third embodiment, during reception of the electromagnetic waves, both the power supply of the transmitter amplifier 3 and the power supply of the doubler 15 are turned off (namely, the supply of power to both the transmitter amplifier 3 and the doubler 15 is turned off), so that substantially no doubled waves of the electromagnetic waves output from the oscillator 1 are produced. Consequently, the doubled waves of the electromagnetic waves output from the oscillator 1, which are returned from the transmission system to the reception system, can be substantially eliminated. Consequently, if the bit number of the A/D converter employed in the third embodiment is the same as that of the vehicle mounted radar apparatus in which the power supply of the transmitter amplifier 3 is not turned off, the maximum sensing distance of the third embodiment can be made longer and the performance of the vehicle mounted radar apparatus can be improved.

As previously explained, a similar effect may be achieved not only in the above-described case in which both the power supplies of the transmitter amplifier 3 and of the doubler 15 are turned off by operating the power supply switch 4 during reception of the electromagnetic waves, but also when the supply of power to either the transmitter amplifier 3 or the doubler 15 is turned off.

Moreover, in order to interrupt the power supply of the transmitter amplifier 3 and the power supply of the doubler 15, the negative voltage on the gate side of the FET employed in the transmitter amplifier 3 may be increased (for example, between –0.2 V and –3 V). Alternatively, the voltage on the drain side of this FET may be decreased (for instance, between 3 V and 0 V). In addition, both these voltage controls may be carried out at the same time.

Also, when the maximum sensing distance of the vehicle mounted radar apparatus with regard to a car is set to 100 m, since the bit number of the A/D converter can be reduced compared to a case where the power supply of the transmitter amplifier 3 is not turned off, a low-cost vehicle mounted radar apparatus can be manufactured. Further, the fundamental wave of the electromagnetic waves output from the oscillator 1, returned from the transmission system to the reception system, are mixed with the even-harmonic-waves of the oscillator 1 in the even-harmonic-wave mixer 16. Consequently, the resulting beat signal has a frequency of approximately 38 GHz, and this beat signal is cut off by the filter 10, so there is no problem. Also, since P (returning) becomes lower than P (returning) of the first and second embodiments, a vehicle with a relative speed of zero can be detected by controlling the threshold level.

Fourth Embodiment

Figure 15:
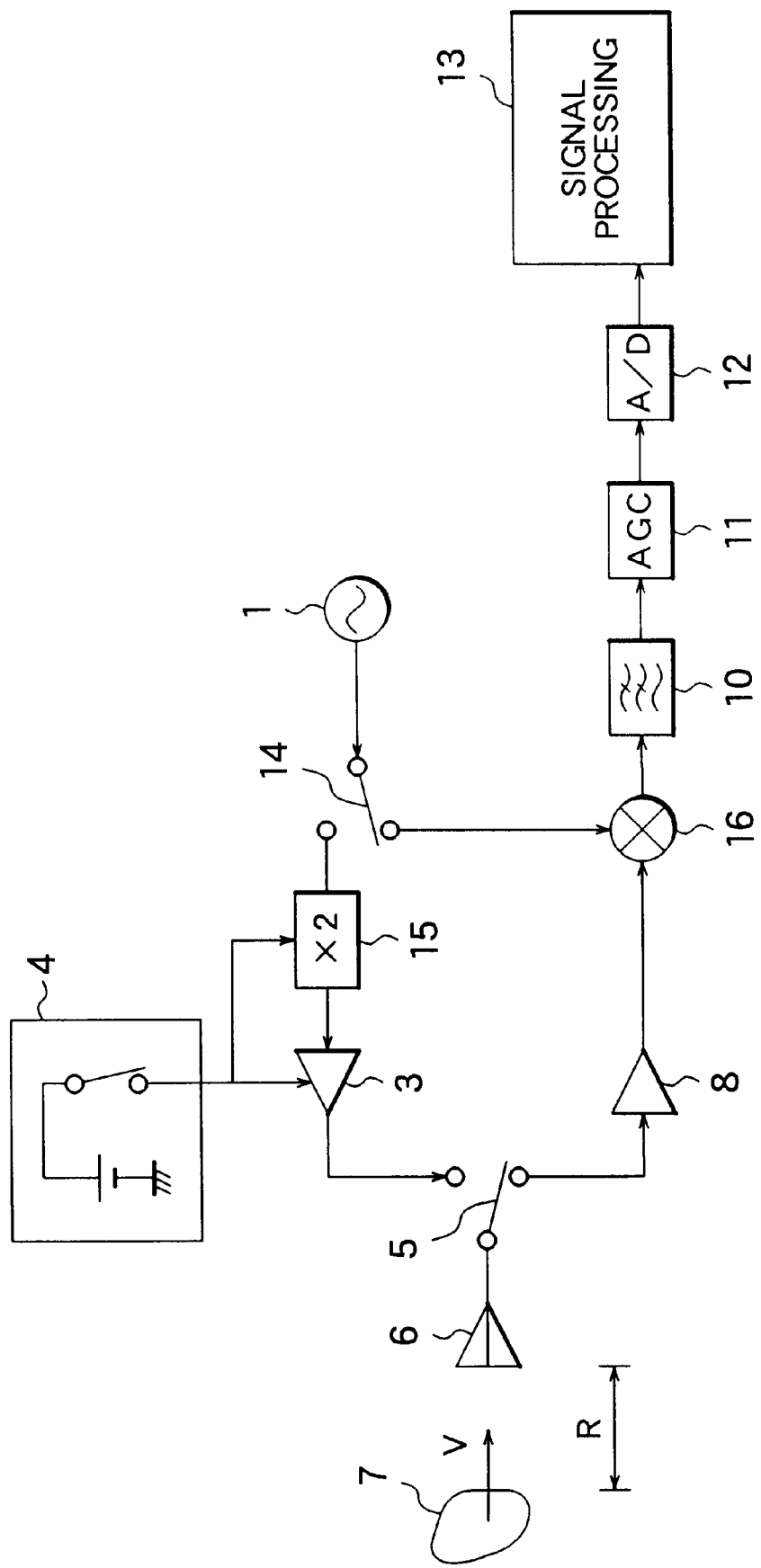
FIG. 15 is a block diagram schematically illustrating a circuit arrangement of a further vehicle mounted radar in the form of a pulse Doppler radar in accordance with a fourth embodiment of the present invention.

Referring now to FIG. 15, a fourth embodiment of the present invention will be described.

FIG. 15 is a block diagram conceptually showing a circuit arrangement of a pulse Doppler radar as a vehicle mounted radar apparatus according to the fourth embodiment of the present invention.

Figure 16:
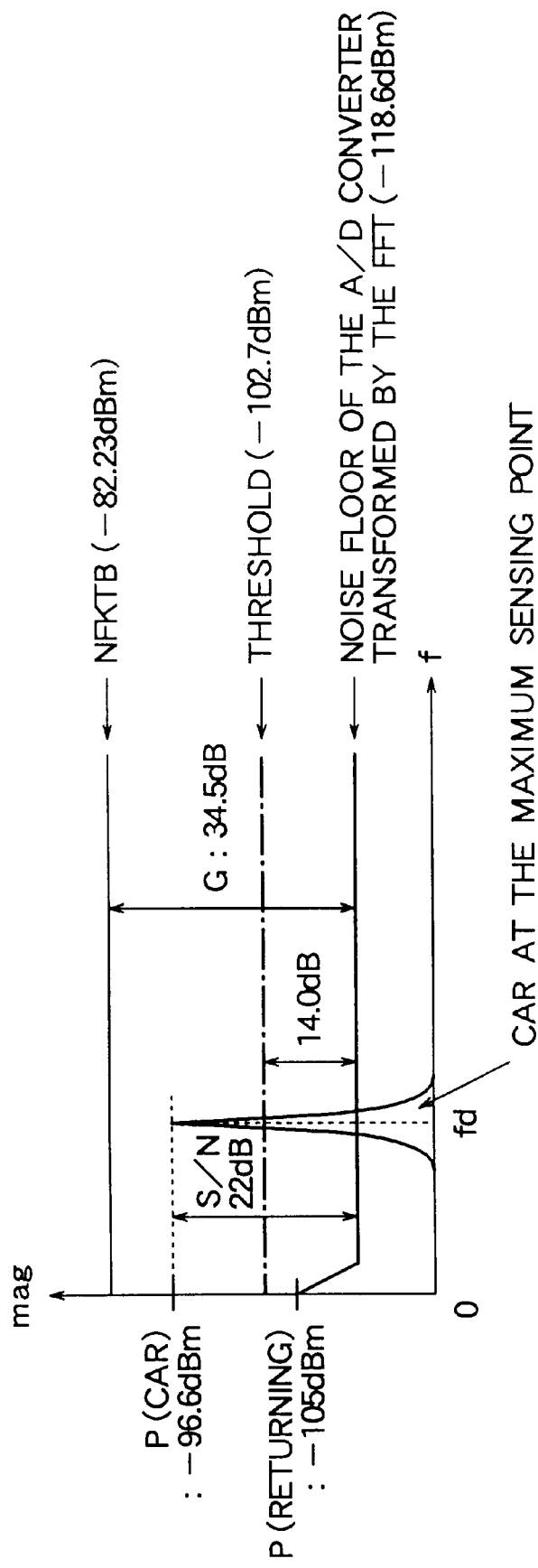
FIG. 16 is a view showing a minimum reception level in the vehicle mounted radar apparatus according to the fourth embodiment of the invention.

FIG. 16 is a graph indicating characteristics of a minimum reception level in the vehicle mounted radar apparatus according to the fourth embodiment of the present invention.

The vehicle mounted radar apparatus according to the fourth embodiment is equipped with an oscillator 1 for generating electromagnetic waves having a transmission frequency ftx=38.25 GHz. This transmission frequency is equal to half of the transmission frequency (ftx=76.5 GHz) of the oscillator 1 employed in the vehicle mounted radar apparatus according to the first and second embodiments.

Also, as indicated in FIG. 15, a doubler 15 acting as a multiplier is provided between the power divider 2 and the transmitter amplifier 3 in the first embodiment (see FIG. 1).

Moreover, both the transmitter amplifier 3 acting as a transmitter and the doubler 15 acting as a multiplier constitute a multiplying transmitter.

Other arrangements of the vehicle mounted radar apparatus are similar to those of the second embodiment, and descriptions thereof are omitted.

Next, a description will be made of the transmission operation of electromagnetic waves of the vehicle mounted radar apparatus according to the fourth embodiment of the present invention.

First, electromagnetic waves having a frequency equal to, for example, half of the transmission frequency ftx=76.5 GHz are output from the oscillator 1. The electromagnetic waves pass through the oscillator output changeover switch 14, are doubled by the doubler 15, and are then amplified by the transmitter amplifier 3 supplied with power by the power supply switch 4. Since the transmitter/receiver changeover switch 5 connects the transmitter amplifier 3 with the common transmitter/receiver antenna 6, the electromagnetic waves amplified by the transmitter amplifier 3 pass through the transmitter/receiver changeover switch 5, and thereafter are output from the antenna 6 to the surrounding environment.

Next, the electromagnetic wave receiving operation of the fourth embodiment will be explained.

The transmitter/receiver changeover switch 5 is switched to the reception side so as to connect the antenna 6 with the receiver amplifier 8 after the passage of a pulse time width "Tg", for instance, Tg=33.3 ns (=1/30 MHz, equal to a distance of 5 m) from the commencement of the electromagnetic wave transmission. Furthermore, at the same time, the oscillator output changeover switch 14 is changed to the reception side in order to connect the oscillator 1 with the even-harmonic-wave mixer 16.

At the same time, the power supply switch 4 is turned off so as to interrupt the supply of power to the transmitter amplifier 3, so that the amplification of the transmission electromagnetic waves is not carried out. Also, the electromagnetic waves output from the antenna 6 are reflected from the target 7 existing at a position separated from the pulse Doppler radar apparatus by a distance "R". Then, the reflected electromagnetic waves enter the antenna 6 with a delay time "Δt" depending upon the distance R with respect to the transmitted electromagnetic waves (see FIG. 2).

When the target has a relative speed, the frequency of the received electromagnetic waves is Doppler-shifted by "fb" with respect to the frequency "ftx" of the transmitted electromagnetic waves, and the Doppler-shifted electromagnetic waves enter the antenna 6. Then, the electromagnetic waves entering from the antenna 6 are amplified by the receiver amplifier 8, and the amplified electromagnetic waves are mixed with the even-harmonic-waves supplied from the oscillator output changeover switch 14 to the LO 13 by the even-harmonic-wave mixer 16. A beat signal corresponding to the Doppler shift fb is output from the mixer 16 (see FIG. 2). The beat signal output from the mixer 16 is filtered by the filter 10, the cut-off frequency of which is selected to be 30 MHz. The filtered beat signal is amplified by the AGC amplifier 11, and then the amplified beat signal is input into the A/D converter 12.

Next, a calculation is made of power "P" (returning) of the transmission power returned to the receiver amplifier 8 during reception. In FIG. 15, let us assume that during transmission of the electromagnetic waves, the transmission power at the feed point of the antenna 6 be selected to be 10 dBm; the gain of the transmitter amplifier 3 be selected to be 14 dB; the loss of the doubler 15 be selected to be 7 dB; the isolation of the doubler 15 be selected to be 50 dB; the isolation of the transmitter amplifier 3 whose power supply is turned off be selected to be 20 dB; the losses of the transmitter/receiver changeover switch 5 and the oscillator output changeover switch 14 be selected to be 2 dB; and the isolation be selected to be 20 dB. In this case, the transmission power "P" (returning) entering the receiver amplifier 8 during reception is defined as follows:

P (returning)=(transmission power entering transmission/reception changeover switch 5)−(isolation of transmission/reception changeover switch 5)−(gain of transmitter amplifier 3)−(isolation of transmission amplifier 3)−(gain of doubler 15)−(isolation of doubler 15)−(isolation of oscillator output changeover switch 14)=12 dBm−20 dB−14 dB−20 dB−(−7dB)−50 (dB)−20 dBm=−105 dBm.

In this case, the reason why the isolation (namely 50 dB) of the doubler 15 becomes larger than the isolation (namely, 20 dB) of the transmitter amplifier 3 is that substantially no doubled wave is produced when the power supply is turned off.

When a threshold used to detect a spectrum of a vehicle is equal to 5 times (=14 dB) the voltage value level of thermal noise after executing the fast Fourier transform (FFT), the threshold level is given as follows:

P (threshold)=(thermal noise)+(FFT integration effect)+(5 times of voltage)=NFKTB−G+14 dB=−82.2 dBm−34.5 dB+14 dB=102.7 dBm.

Accordingly, since P (threshold)>P (returning), the returning signal cannot be detected. Consequently, even when the relative speed of a vehicle is equal to zero, it is possible to detect the vehicle within the maximum sensing distance.

As previously described, with the vehicle mounted radar apparatus according to the fourth embodiment of the present invention, since the oscillator output changeover switch 14 is used, the power of the electromagnetic waves output from the oscillator 1, returned to the doubler 15, can be suppressed. Also, in accordance with the vehicle mounted radar apparatus of the fourth embodiment, during reception of the electromagnetic waves, both the power supply of the transmitter amplifier 3 and the power supply of the doubler 15 are turned off (namely, the supply of powers to both the transmitter amplifier 3 and the doubler 15 are turned off, so that substantially no doubled wave of the electromagnetic waves output from the oscillator 1 are produced. Consequently, the doubled waves of the electromagnetic waves output from the oscillator 1, returned from the transmission system to the reception system, can be substantially eliminated.

Consequently, if the bit number of the A/D converter employed in the fourth embodiment is the same as that of the vehicle mounted radar apparatus in which the power supply of the transmitter amplifier 3 is not turned off, then the maximum sensing distance of the fourth embodiment can be made longer and the performance of the vehicle mounted radar apparatus can be improved.

As previously explained, a similar effect may be achieved not only in the above-described case wherein the power supply of both the transmitter amplifier 3 and of the doubler 15 is turned off by operating the power supply switch 4 during reception of the electromagnetic waves, but also when either the supply of power to the transmitter amplifier 3 or the supply of power to the doubler 15 is turned off.

Also, when the maximum sensing distance of the vehicle mounted radar apparatus with regard to a car is set to 100 m, since the bit number of the A/D converter can be reduced, a low-cost vehicle mounted radar apparatus can be manufactured, compared to a case where the power supply of the transmitter amplifier 3 is not turned off. Further, the fundamental wave of the electromagnetic waves output from the oscillator 1, which are returned from the transmission system to the reception system, is mixed with the even-harmonic-waves of the oscillator 1 in the even-harmonic-wave mixer 16. Consequently, the resulting beat signal has a frequency of approximately 38 GHz, and the beat signal is cut off by the filter 10, so there is no problem.

Moreover, in general, input impedance of the transmitter amplifier 3 will be changed by turning on/off the power supply of the transmitter amplifier 3. However, since the oscillator output changeover switch 14 is employed, the adverse influences on the output power and oscillation frequency of the oscillator can be minimized. It should also be noted that even when the transmitter/receiver changeover switch 5 is replaced by a circulator, a similar effect may be achieved. In addition, the vehicle mounted radar apparatus can detect a vehicle with a relative speed of zero and which is located far from the radar apparatus.

As described in detail in the foregoing, the vehicle mounted radar apparatus according to the present invention has the following advantages.

First, a vehicle mounted radar apparatus according to a first aspect of the invention comprises an oscillator for generating electromagnetic waves, a transmitter for transmitting to a target the electromagnetic waves generated by the oscillator, a receiver for receiving the electromagnetic waves reflected from the target, a switch for connecting the transmitter to an antenna during transmission of the electromagnetic waves, and for connecting the antenna to the receiver during reception of the electromagnetic waves, a signal processor for calculating a distance between the vehicle and the target, and also a relative speed between the vehicle and the target based upon the electromagnetic waves transmitted to the target and the electromagnetic waves reflected from the target, and a power supply interrupter for interrupting the supply of power to the transmitter, wherein during reception of the electromagnetic waves, the supply of power to the transmitter is turned off by the power supply interrupter, so that transfer of the electromagnetic waves from the transmitter to the receiver can be prevented. With this arrangement, the maximum sensing distance can be increased, and the vehicle mounted radar apparatus having improved performance can be obtained. Also, since the bit number of an A/D converter employed can be reduced, a low-cost vehicle mounted radar apparatus can be obtained.

Furthermore, in one form of the first aspect of the invention, the vehicle mounted radar apparatus further comprises a divider for dividing the electromagnetic waves output from the oscillator, and for transmitting part of the divided electromagnetic waves to the transmitter, and a mixer for mixing the other part of the divided electromagnetic waves with the electromagnetic waves reflected from the target to thereby transfer the mixed electromagnetic waves to the signal processor. Consequently, the maximum sensing distance can be increased, and the vehicle mounted radar apparatus having improved performance can be obtained. Also, the bit number of the A/D converter can be further reduced, so a low-cost vehicle mounted radar apparatus can be obtained.

Furthermore, in another form of the first aspect of the invention, the vehicle mounted radar apparatus further comprises an oscillator output switcher for transferring the electromagnetic waves output from the oscillator to the transmitter during transmission of the electromagnetic waves, and for transferring the electromagnetic waves output from the oscillator to the signal processor during reception of the electromagnetic waves, and a mixer for mixing the electromagnetic waves transferred from the oscillator via the oscillator output switcher with the electromagnetic waves reflected from the target. Consequently, the maximum sensing distance can be increased, and the vehicle mounted radar apparatus having improved performance can be obtained. Also, the bit number of the A/D converter can be further reduced, so a low-cost vehicle mounted radar apparatus can be obtained. Furthermore, adverse influences on the oscillation output power and the oscillation frequency of the oscillator which would otherwise be caused by turning on/off the power supply of the transmitter can be minimized.

A vehicle mounted radar apparatus according to a second aspect of the present invention comprises an oscillator for generating electromagnetic waves, a multiplying transmitter for multiplying the electromagnetic waves generated by the oscillator to thereby transmit the multiplied electromagnetic waves to a target, a receiver for receiving the electromagnetic waves reflected from the target, a switch for connecting the multiplying transmitter to an antenna during transmission of the electromagnetic waves, and for connecting the antenna to the receiver during reception of the electromagnetic waves, a signal processor for calculating a distance between the vehicle and the target and a relative speed between the vehicle and the target based upon the electromagnetic waves transmitted to the target and the electromagnetic waves reflected from the target, and a power supply interrupter for interrupting the supply of power to the multiplying transmitter. During reception of the electromagnetic waves, the supply of power to the multiplying transmitter is turned off by the power supply interrupter, so that transfer of the electromagnetic waves from the multiplying transmitter to the receiver can be prevented. With this arrangement, the maximum sensing distance can be increased, and the vehicle mounted radar apparatus having improved performance can be obtained. Also, the bit number of an A/D converter employed can be reduced, so a low-cost vehicle mounted radar apparatus can be obtained.

Furthermore, in one form of the second aspect of the invention, the vehicle mounted radar apparatus further comprises a divider for dividing the electromagnetic waves output from the oscillator, and for transferring part of the divided electromagnetic waves to the multiplying transmitter, and an even-harmonic-wave mixer for mixing second harmonic waves of the other divided electromagnetic wave with the electromagnetic waves reflected from the target to thereby transfer the mixed electromagnetic waves to the signal processor. Consequently, the maximum sensing distance can be further increased, and the vehicle mounted radar apparatus having further improved performance can be obtained. Also, the bit number of the AND converter can be further reduced, so a low-cost vehicle mounted radar apparatus can be obtained. Furthermore, when a threshold level used in the signal processor is properly controlled, a vehicle having a relative speed of zero may be detected.

Furthermore, in another form of the second aspect of the invention, the vehicle mounted radar apparatus further comprises an oscillator output switcher for transferring the electromagnetic waves output from the oscillator to the multiplying transmitter during transmission of the electromagnetic waves, and for transferring the electromagnetic waves output from the oscillator to the signal processor during reception of the electromagnetic waves, and an even-harmonic-wave mixer for mixing second harmonic waves of the electromagnetic waves transferred from the oscillator via the oscillator output switcher with the electromagnetic waves reflected from the target. Consequently, the maximum sensing distance can be increased, and the vehicle mounted radar apparatus having further improved performance can be obtained. Also, the bit number of the AND converter can be further reduced, so a further low-cost vehicle mounted radar apparatus can be obtained. Furthermore, adverse influences on the oscillation output power and the oscillation frequency of the oscillator which would otherwise be caused by turning on/off the power supply of the transmitter can be minimized. Also, a vehicle having a relative speed of zero may be detected.

Also, in a further form of the second aspect of the invention, the multiplying transmitter comprises a transmitter and a multiplier, and the power supply interrupter interrupts the supply of power to the transmitter during reception of the electromagnetic waves. As a result, the vehicle mounted radar apparatus equipped with such an simple arrangement can avoid problems such as the electromagnetic waves being transferred from the multiplying transmitter to the receiver during reception of the electromagnetic waves.

Also, in a still further form of the second aspect of the invention, the multiplying transmitter comprises a transmitter and a multiplier, and the power supply interrupter interrupts the supply of power to the multiplier during reception of the electromagnetic waves. Consequently, the vehicle mounted radar apparatus with a simple arrangement can avoid problems such as the electromagnetic waves being transferred from the multiplying transmitter to the receiver during reception of the electromagnetic waves.

Furthermore, in a yet further form of the second aspect of the invention, the multiplying transmitter comprises a transmitter and a multiplier, and a power supply interrupter interrupts the supply of power to the transmitter and the multiplier during reception of the electromagnetic waves. As a result, the vehicle mounted radar apparatus with a simple arrangement can avoid problems such as the electromagnetic waves being transferred from the multiplying transmitter to the receiver during reception of the electromagnetic waves.

What is claimed is:

1. A vehicle mounted radar apparatus comprising:

an oscillator for generating electromagnetic waves;

a transmitter for transmitting the electromagnetic waves generated by said oscillator to a target;

a receiver for receiving electromagnetic waves reflected from the target;

an antenna for use with said transmitter and said receiver;

a switch for connecting said transmitter to said antenna during transmission of the electromagnetic waves, and for connecting said antenna to said receiver during reception of the electromagnetic waves;

a signal processor for calculating a distance between the vehicle and the target, and also a relative speed between the vehicle and the target based upon the electromagnetic waves transmitted to the target and the electromagnetic waves reflected from the target; and a power supply interrupter for interrupting supply of a voltage to only said transmitter;

wherein during reception of the electromagnetic waves, said power supply interrupter interrupts the supply of voltage to said transmitter to thereby prevent transfer of the electromagnetic waves from said transmitter to said receiver.

2. A vehicle mounted radar apparatus as claimed in claim 1, further comprising:

a divider for dividing the electromagnetic waves output from said oscillator, and for transferring part of said divided electromagnetic waves to said transmitter; and a mixer for mixing the other part of the electromagnetic waves divided by said divider with the electromagnetic waves reflected from said target to thereby transfer the mixed electromagnetic waves to said signal processor.

3. A vehicle mounted radar apparatus as claimed in claim 1, further comprising:

an oscillator output switcher for transferring the electromagnetic waves output from said oscillator to said transmitter during transmission of the electromagnetic waves, and for transferring the electromagnetic waves output from said oscillator to said signal processor during reception of the electromagnetic waves; and a mixer for mixing the electromagnetic waves transfered from said oscillator via said oscillator output switcher with the electromagnetic waves reflected from said target.

4. A vehicle mounted radar apparatus comprising:

an oscillator for generating electromagnetic waves;

a multiplying transmitter for multiplying the electromagnetic waves output from said oscillator and transmitting the multiplied electromagnetic waves to a target;

a receiver for receiving electromagnetic waves reflected from the target;

an antenna for use with said transmitter and said receiver;

a switch for connecting said multiplying transmitter to said antenna during transmission of the electromagnetic waves, and for connecting said antenna to said receiver during reception of the electromagnetic waves;

a signal processor for calculating a distance between the vehicle and the target and a relative speed between the vehicle and the target based upon the electromagnetic waves transmitted to and reflected from the target; and a power supply interrupter for interrupting a supply of power to only said multiplying transmitter;

wherein during reception of the electromagnetic waves, the supply of power to said multiplying transmitter is turned off by said power supply interrupter, so that transfer of the electromagnetic waves from said multiplying transmitter to said receiver can be prevented.

5. A vehicle mounted radar apparatus as claimed in claim 4, further comprising:

a divider for dividing the electromagnetic waves output from said oscillator, and for transferring part of said divided electromagnetic waves to said multiplying transmitter; and an even-harmonic-wave mixer for mixing second harmonic waves of the other divided electromagnetic waves with the electromagnetic waves reflected from said target to thereby transfer the mixed electromagnetic waves to said signal processor.

6. A vehicle mounted radar apparatus as claimed in claim 5 wherein said multiplying transmitter comprises a transmitter and a multiplier, and said power supply interrupter interrupts the supply of power to said transmitter during reception of the electromagnetic waves.

7. A vehicle mounted radar apparatus as claimed in claim 5 wherein said multiplying transmitter comprises a transmitter and a multiplier, and said power supply interrupter interrupts the supply of power to said multiplier during reception of the electromagnetic waves.

8. A vehicle mounted radar apparatus as claimed in claim 5 wherein said multiplying transmitter comprises a transmitter and a multiplier, and said power supply interrupter interrupts the supply of power to said transmitter and said multiplier during reception of the electromagnetic waves.

9. A vehicle mounted radar apparatus as claimed in claim 4, further comprising:

an oscillator output switcher for transferring the electromagnetic waves output from said oscillator to said multiplying transmitter during transmission of the electromagnetic waves, and for transferring the electromagnetic waves output from said oscillator to said signal processor during reception of the electromagnetic waves; and an even-harmonic-wave mixer for mixing the second harmonic waves of the electromagnetic waves transferred from said oscillator via said oscillator output switcher with the electromagnetic waves reflected from said target.

\* \* \* \* \*